(12) United States Patent
Kagawa et al.

(10) Patent No.: US 9,671,539 B2
(45) Date of Patent: Jun. 6, 2017

(54) POLARIZING PLATE COMPRISING AN OPTICAL FILM INCLUDING AN ALIGNMENT LAYER, AN ANISOTROPIC LAYER, AND AN ISOTROPIC ACRYLIC POLYMER LAYER AND METHOD FOR PRODUCING THE SAME

(71) Applicant: FUJIFILM Corporation, Tokyo (JP)

(72) Inventors: Hideaki Kagawa, Kanagawa (JP);
Kazuhiro Oki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 41 days.

(21) Appl. No.: 14/925,184

(22) Filed: Oct. 28, 2015

(65) Prior Publication Data

US 2016/0062014 A1    Mar. 3, 2016

Related U.S. Application Data

(63) Continuation of application No. PCT/JP2014/063329, filed on May 20, 2014.

(30) Foreign Application Priority Data

May 21, 2013 (JP) ................................. 2013-107504

(51) Int. Cl.
*G02B 5/30* (2006.01)
*B29C 65/00* (2006.01)
(Continued)

(52) U.S. Cl.
CPC ............ *G02B 5/3016* (2013.01); *B29C 65/48* (2013.01); *B29C 66/0224* (2013.01);
(Continued)

(58) Field of Classification Search
CPC ........ G02B 5/3016; G02B 1/14; G02B 5/305; B29C 66/0224; B29L 2011/0066; B29D 11/00644; B29D 11/00
See application file for complete search history.

(56) References Cited

U.S. PATENT DOCUMENTS

| | | | |
|---|---|---|---|
| 2008/0100780 A1* | 5/2008 | Suzuki | G02B 5/3033 349/96 |
| 2009/0027596 A1* | 1/2009 | Toyama | G02B 5/3083 349/75 |

(Continued)

FOREIGN PATENT DOCUMENTS

| | | |
|---|---|---|
| CN | 101408638 A | 4/2009 |
| JP | 2005-070096 A | 3/2005 |

(Continued)

OTHER PUBLICATIONS

International Preliminary Report on Patentability issued by WIPO on Nov. 24, 2015 in connection with International Patent Application No. PCT/JP2014/063329.

(Continued)

*Primary Examiner* — Paul Lee
(74) *Attorney, Agent, or Firm* — Jean C. Edwards, Esq.; Edwards Neils LLC

(57) ABSTRACT

The present invention provides a polarizing plate that includes a polarizer, and an optical film including an alignment layer, an optically anisotropic layer, and an optically isotropic acrylic polymer layer on at least one surface of the polarizer, in which the optically anisotropic layer is a layer formed by irradiating a polymerizable composition including a liquid crystal compound that is directly applied to the alignment layer with light to polymerize the liquid crystal compound, the acrylic polymer layer is a layer formed by curing a polymerizable composition including (meth)acrylate that is directly applied to a surface of the layer formed (Continued)

from the polymerizable composition including a liquid crystal compound, and the thickness of the acrylic polymer layer is larger than the thickness of the optically anisotropic layer. According to the present invention, it is possible to provide a polarizing plate having a small thickness.

20 Claims, 1 Drawing Sheet

(51) Int. Cl.
| | |
|---|---|
| *B29D 11/00* | (2006.01) |
| *B29C 65/48* | (2006.01) |
| *B32B 5/00* | (2006.01) |
| *B32B 27/30* | (2006.01) |
| *G02B 1/14* | (2015.01) |
| *B29L 11/00* | (2006.01) |

(52) U.S. Cl.
CPC ...... *B29C 66/7338* (2013.01); *B29D 11/0073* (2013.01); *B29D 11/00644* (2013.01); *B32B 5/00* (2013.01); *B32B 27/308* (2013.01); *G02B 5/3083* (2013.01); *B29K 2633/08* (2013.01); *B29L 2011/0066* (2013.01); *B32B 2307/42* (2013.01); *G02B 1/14* (2015.01); *G02B 5/305* (2013.01)

(56) References Cited

U.S. PATENT DOCUMENTS

| | | | | |
|---|---|---|---|---|
| 2009/0033833 A1* | 2/2009 | Aminaka | ............... | C09J 133/06 349/68 |
| 2009/0086126 A1* | 4/2009 | Ohgaru | ............... | G02B 1/105 349/96 |
| 2010/0231831 A1* | 9/2010 | Miyatake | ............ | G02F 1/13363 349/96 |
| 2010/0232018 A1* | 9/2010 | Kobayashi | ................ | B32B 7/12 359/488.01 |
| 2010/0253884 A1* | 10/2010 | Katou | .................. | G02B 5/3033 349/96 |

FOREIGN PATENT DOCUMENTS

| | | |
|---|---|---|
| JP | 2006-184640 A | 7/2006 |
| JP | 2008-009403 A | 1/2008 |
| JP | 2008-183812 A | 8/2008 |
| JP | 2008-216995 A | 9/2008 |
| JP | 2009-175222 A | 8/2009 |
| JP | 2010-066630 A | 3/2010 |
| JP | 2011-133549 A | 7/2011 |
| JP | 2013-050572 A | 3/2013 |
| WO | 2006/070936 A1 | 7/2006 |

OTHER PUBLICATIONS

International Search Report issued in PCT/JP2014/063329 on Aug. 26, 2014.
Written Opinion issued in PCT/JP2014/063329 on Aug. 26, 2014.
Office Action, issued by the Japanese Patent Office (JPO) on Nov. 22, 2016, in connection with corresponding Japanese Patent Application No. 2015-518257.
Office Action issued by the State Intellectual Property Office of the People's Republic of China on Mar. 2, 2017, in connection with corresponding Chinese Patent Application No. 201480029229.6.

* cited by examiner

| 3 |
|---|
| 2 |
| 12 |
| 1 |
| 4 |

| 12 |
|---|
| 2 |
| 3 |
| 1 |
| 4 |

| 5 |
|---|
| 3 |
| 2 |
| 12 |
| 1 |
| 4 |

| 5 |
|---|
| 12 |
| 2 |
| 3 |
| 1 |
| 4 |

| 3 |
|---|
| 2 |
| 12 |
| 6 |
| 1 |
| 4 |

| 12 |
|---|
| 2 |
| 3 |
| 6 |
| 1 |
| 4 |

| 5 |
|---|
| 3 |
| 2 |
| 12 |
| 6 |
| 1 |
| 4 |

| 5 |
|---|
| 12 |
| 2 |
| 3 |
| 6 |
| 1 |
| 4 |

| 6 |
|---|
| 3 |
| 2 |
| 12 |
| 1 |
| 4 |

| 6 |
|---|
| 12 |
| 2 |
| 3 |
| 1 |
| 4 |

| 5 |
|---|
| 6 |
| 3 |
| 2 |
| 12 |
| 1 |
| 4 |

| 5 |
|---|
| 6 |
| 12 |
| 2 |
| 3 |
| 1 |
| 4 |

POLARIZING PLATE COMPRISING AN OPTICAL FILM INCLUDING AN ALIGNMENT LAYER, AN ANISOTROPIC LAYER, AND AN ISOTROPIC ACRYLIC POLYMER LAYER AND METHOD FOR PRODUCING THE SAME

CROSS-REFERENCE TO RELATED APPLICATIONS

This application is a continuation of PCT International Application No. PCT/JP2014/063329 filed on May 20, 2014, which was published under PCT Article 21(2) in Japanese, and claims priority under 35 U.S.C §119 (a) to Japanese Patent Application No. 2013-107504 filed on May 21, 2013. The above applications are hereby expressly incorporated by reference, in their entirety, into the present application.

BACKGROUND OF THE INVENTION

1. Field of the Invention

The present invention relates to a polarizing plate and a method for producing the same, and an optical film material.

2. Description of the Related Art

With expansion of markets for smartphones, tablet PCs, and the like, there has been an increasing demand for reducing the thickness of a display. In this trend, attempts have been made to use various films such as an acrylic polymer film and a cycloolefin polymer film as a protective film of a polarizing plate, in addition to a cellulose acylate polymer film that has been used as an optical film which is transparent and has a low birefringence in the related art (for example, refer to JP2009-175222A). Since these films are expensive and there arises a problem of deformation or the like during handling, there is room for improvement for practical use.

On the other hand, in the related art, it has been known that a phase difference film is used for viewing angle compensation of a liquid crystal display device (for example, JP2006-184640A), and further, it has been known that for a polarizing plate, a film having a predetermined phase difference is used as a protective film (for example, JP2013-050572A and JP2011-133549A).

SUMMARY OF THE INVENTION

An object of the present invention is to provide a polarizing plate having a small thickness. Particularly, an object of the present invention is to provide a polarizing plate including a thin optical film having a phase difference. Another object of the present invention is to provide a method for producing the polarizing plate.

In order to prevent the above-mentioned deformation and damage or to obtain good handleablity, a thin film is produced and transported as a material to which a laminate film is attached in some cases. The present inventors have made an attempt to prepare an acrylic polymer film by using a film that can function as a laminate film for forming a thin film as a temporary support and applying a composition including a polymerizable compound to the temporary support to polymerize the compound. However, the inventors have faced a problem of insufficient peelability between the temporary support and the acrylic polymer film. As a result of intensive investigations to solve this problem, the inventors have been found that the peelability of the acrylic polymer layer from the temporary support is improved by providing an optically anisotropic layer to be formed from a liquid crystal compound before forming the acrylic polymer layer on the temporary support. The inventors have been also found that with this, it is possible to peel the thin film optically anisotropic layer off from the temporary support without causing defects at the same time. That is, in the related art, even through trial and error, a thin film (optically anisotropic layer) having a phase difference formed by photocuring a composition including a liquid crystal compound has not been peeled off form a temporary support without causing defects and the inventors have had the difficulty of the film suffering from being easily broken when the thin film having a phase difference is peeled off from the temporary support. However, it has been found that through a combination with the acrylic polymer layer, this peeling-off becomes possible.

Based on the above findings, the inventors have obtained an optical film material that can be provided as a protective film for a polarizing plate and have conducted further investigations, thereby completing the present invention. That is, the present invention provides the following [1] to [15].

[1] A polarizing plate including:
a polarizer; and
an optical film including an alignment layer, an optically anisotropic layer, and an optically isotropic acrylic polymer layer on at least one surface of the polarizer,
in which the optically anisotropic layer is a layer formed by irradiating a polymerizable composition including a liquid crystal compound that is directly applied to the alignment layer with light to polymerize the liquid crystal compound,
the acrylic polymer layer is a layer formed by curing a polymerizable composition including (meth)acrylate that is directly applied to a surface of the layer formed from the polymerizable composition including a liquid crystal compound, and
the thickness of the acrylic polymer layer is larger than the thickness of the optically anisotropic layer.

[2] The polarizing plate according to [1], in which the thickness of the optically anisotropic layer is 0.5 μm to 5 μm.

[3] The polarizing plate according to [1], in which the thickness of the optically anisotropic layer is 0.5 μm to 3 μm.

[4] The polarizing plate according to any one of [1] to [3], in which the alignment layer, the optically anisotropic layer, the acrylic polymer layer, and the polarizer are disposed in this order.

[5] The polarizing plate according to [4], in which only an adhesive layer or only an adhesive layer and a protective film provided on the surface of the polarizer are provided between the acrylic polymer layer and the polarizer.

[6] The polarizing plate according to any one of [1] to [3], in which the acrylic polymer layer, the optically anisotropic layer, the alignment layer, and the polarizer are disposed in this order.

[7] The polarizing plate according to [6], in which only an adhesive layer or only an adhesive layer and a protective film provided on the surface of the polarizer are provided between the alignment layer and the polarizer.

[8] The polarizing plate according to any one of [1] to [7], in which the optical film is provided on any one of surfaces of the polarizer and a cellulose acylate polymer film, an acrylic polymer film, or a cycloolefin polymer film is provided on the other surface.

[9] The polarizing plate according to any one of [1] to [8], in which the liquid crystal compound is a compound having two or more (meth)acrylic groups.

[10] The polarizing plate according to any one of [1] to [9], in which a hard coat layer is provided as an outermost layer on the side closer to the optical film with respect to the polarizer.

[11] A method for producing the polarizing plate according to any one of [1] to [10] including:

(1) preparing the following optical film material including a temporary support, an alignment layer, an optically anisotropic layer, and an optically isotropic acrylic polymer layer, in which the optically anisotropic layer is a layer formed by irradiating a polymerizable composition including a liquid crystal compound that is directly applied to the alignment layer with light to polymerize the liquid crystal compound, the acrylic polymer layer is a layer formed by curing a polymerizable composition including (meth)acrylate that is directly applied to a surface of the layer formed from the polymerizable composition including a liquid crystal compound, and the thickness of the acrylic polymer layer is larger than the thickness of the optically anisotropic layer;

(2) peeling off the temporary support of the optical film material; and (3) laminating the optical film material or an optical film after peeling off the temporary support on a film including a polarizer.

[12] The method according to [11], in which the optical film material is laminated on the film including a polarizer on the surface on the side closer to the acrylic polymer layer when viewed from the optically anisotropic layer and then the temporary support of the optical film material is peeled off.

[13] The method according to [11], in which the temporary support of the optical film material is peeled off and then the optical film after the peeling-off of the temporary support is laminated on the film including a polarizer.

[14] The method according to any one of [11] to [13], in which the lamination is performed through an adhesive layer.

[15] An optical film material that is produced using the method according to any one of [11] to [14], the material including:

a temporary support;

an alignment layer;

an optically anisotropic layer; and an optically isotropic acrylic polymer layer, in which the optically anisotropic layer is a layer formed by irradiating a polymerizable composition including a liquid crystal compound that is directly applied to the alignment layer with light to polymerize the liquid crystal compound, the acrylic polymer layer is a layer formed by curing a polymerizable composition including (meth)acrylate that is directly applied to a surface of the layer formed from the polymerizable composition including a liquid crystal compound, and the thickness of the acrylic polymer layer is larger than the thickness of the optically anisotropic layer.

According to the present invention, there are provided a thin film polarizing plate having an optical compensation function, and a method for producing the same.

BRIEF DESCRIPTION OF THE DRAWING

The FIGURE is a view showing examples of a layer configuration of a polarizing plate of the present invention.

DESCRIPTION OF THE PREFERRED EMBODIMENTS

Hereinafter, the present invention will be described in detail.

In the present specification, a numerical range indicated using "to" indicates a range including a numerical value given before "to" as a minimum value and a numerical value given after "to" as a maximum value. The term "polarizing plate" as used in the present specification, unless otherwise specified, is intended to include both a long length of polarizing plate and a polarizing plate cut into a size suitable for incorporation into a liquid crystal device (the term "cut" as used in the present specification is intended to include "stamp" and "cut up into"). In addition, the term "polarizing plate" is used in the present specification as distinguished from the term "polarizer (also referred to as a "polarizing film" in some cases)", and the term "polarizing plate" means a laminate of a polarizer having a film provided on at least one surface of the "polarizer".

The term "(meth)acrylate" as used in the present specification means "either or both of acrylate and methacrylate". The same will be applied to "(meth)acrylic acid", "(meth) acrylic group" and the like.

Re ($\lambda$) and Rth ($\lambda$) as used in the present specification represent an in-plane retardation and a retardation in the thickness direction at a wavelength $\lambda$, respectively. Re ($\lambda$) is measured using a KOBRA 21ADH or WR (produced by Oji Scientific Instruments) by making light having a wavelength of $\lambda$ nm incident in a film normal direction. For selection of the measurement wavelength of $\lambda$ nm, measurement can be performed by manually exchanging the wavelength selection filter, or converting the measured values by a program or the like.

When the film to be measured is expressed as a uniaxial or biaxial index ellipsoid, Rth ($\lambda$) is calculated in the following manner.

Rth ($\lambda$) is calculated by a KOBRA 21ADH or WR based on measured retardation values, an assumed value of average refractive index, and an inputted film thickness value. As the retardation values, Re ($\lambda$) values are measured at a total of 6 points by applying light having a wavelength of $\lambda$ nm to a film from the directions tilted respectively in steps of 10 degrees up to 50 degrees from the normal direction with respect to the film normal direction by using an in-plane slow axis (determined by the KOBRA 21ADH or WR) as a tilt axis (rotational axis), (an arbitrary film in-plane direction being regarded as the rotational axis when there is no slow axis).

In the above description, in the case of a film having a direction in which a retardation value becomes zero at a certain tilt angle from the normal direction with the in-plane slow axis as the rotational axis, the retardation value at a tilt angle larger than the tilt angle is calculated by the KOBRA 21ADH or WR after changing the sign to negative.

Incidentally, retardation values are measured from two given tilted directions with the slow axis as a tilt axis (rotational axis), (an arbitrary film in-plane direction being regarded as the rotational axis when there is no slow axis). Thus, it is also possible to calculate Rth according to Equations (11) and (12) below based on the measured retardation values, the assumed value of the average refractive index, and the inputted film thickness value.

$$\mathrm{Re}(\theta) = \left[ nx = \frac{(ny \times nz)}{\left( \sqrt{\left( ny\sin\left(\sin^{-1}\left(\frac{\sin(-\theta)}{nx}\right)\right)\right)^2 + \left( nz\cos\left(\sin^{-1}\left(\frac{\sin(-\theta)}{nx}\right)\right)\right)^2} \right)} \right] \times \frac{d}{\cos\left(\sin^{-3}\left(\frac{\sin(-\theta)}{nx}\right)\right)}$$

Equation (11)

The Re (θ) represents a retardation value in a direction tilted at an angle θ from the normal direction.

In Equation (11), nx represents the refractive index in the slow axis direction in the plane, ny represents the refractive index in a direction orthogonal to that of nx in the plane, and nz represents the refractive index in a direction orthogonal to those of nx and ny. d represents the film thickness.

$$Rth=\{(nx+ny)/2-nz\} \times d \qquad \text{Equation (12)}$$

In Equation (12), nx represents the refractive index in the slow axis direction in the plane, ny represents the refractive index in a direction orthogonal to that of nx in the plane, and nz represents the refractive index in a direction orthogonal to those of nx and ny. d represents the film thickness.

When the film to be measured cannot be expressed by a uniaxial or biaxial refractive index ellipsoid, for example, is a so-called film having no optic axis, Rth (λ) is calculated in the following manner.

Rth (λ) is calculated by a KOBRA 21ADH or WR based on measured retardation values, an assumed value of average refractive index, and a inputted film thickness value. As the retardation values, Re (λ) values are measured at 11 points by applying light having a wavelength of λ nm to a film from the directions tilted respectively in steps of 10 degrees from −50 degrees up to +50 degrees with respect to the film normal direction by using an in-plane slow axis (determined by the KOBRA 21ADH or WR) as a tilt axis (rotational axis).

In the above measurement, as for the assumed values of average refractive indexes, values described in "Polymer Handbook" (JOHN WILEY&SONS, INC.) and catalogues of various optical films can be used. As for a film of which an average refractive index value is unknown, the value can be measured by an Abbe refractometer. The values of the average refractive indexes of main optical films are exemplarily described as follows: celluloseacylate (1.48), cycloolefin polymer (1.52), polycarbonate (1.59), polymethyl methacrylate (1.49), and polystyrene (1.59). The KOBRA 21ADH or WR calculates values of nx, ny, and nz by inputting the assumed values of average refractive indexes and the film thickness. Based on the calculated values of nx, ny and nz, a value of Nz is further calculated by the equation, Nz=(nx−nz)/(nx−ny).

In the present specification, the measurement wavelength is 550 nm unless otherwise specified. For example, the case in which simply Re is used represents Re (550).

In addition, in the present specification, angles (for example, angles of "90°" and the like) and relationships thereof (for example, terms "orthogonal to", "parallel to", "crossing at 45°" and the like) should be so interpreted as to include ranges of errors generally acceptable in technical fields to which the present invention belongs, which means that angles are, for example, within ranges of strict angles less than ±10°, and the errors from strict angles are preferably 5° or less, and more preferably 3° or less. Moreover, the fact that retardation is substantially 0 means that Re (550)≤10 nm and Rth (550)≤10 nm and preferably Re (550)≤5 nm and Rth (550)≤5 nm.

[Polarizing Plate]

The polarizing plate of the present invention includes an optical film including an alignment layer, an optically anisotropic layer, and an optically isotropic acrylic polymer layer, and a polarizer. The optical film may be disposed on any one of or both of surfaces of the polarizer. The polarizing plate of the present invention may further include other layers such as a protective film for protecting the polarizer or the surface of the optically anisotropic layer. In the optical film of the polarizing plate of the present invention, from the side closer to the polarizer, the alignment layer, the optically anisotropic layer, and the acrylic polymer layer may be laminated in this order or the acrylic polymer layer, the optically anisotropic layer, and the alignment layer may be laminated in this order. It is also preferable that any one of the alignment layer or the acrylic polymer layer is directly bonded to the polarizer through an adhesive layer, that is, only an adhesive layer is provided between any one of the alignment layer or the acrylic polymer layer and the polarizer.

The FIGURE shows an example of the layer configuration of the polarizing plate of the present invention. In the FIGURE, the adhesive layer is omitted.

[Optical Film]

In the specification, the optical film means a film that can be used for optical members such as various optical elements of various display devices, light-emitting devices, polarizing plates and the like. In the present invention, it is preferable that the thickness of the optical film is, for example, about 100 μm or less, 60 μm or less, 40 μm or less, 25 μm or less, 10 μm or less, or 5 μm or less. It is also preferable that the optical film is transparent (for example, the light transmittance is 80% or more). The optical film may have low birefringence or high birefringence. However, it is preferable that the optical film has controlled birefringence.

[Optically Anisotropic Layer]

The optically anisotropic layer is a layer that has at least one incidence direction in which retardation is substantially not 0 when retardation is measured, that is, a layer that does not have isotropic optical characteristics. The optically anisotropic layer used in the present invention is formed by irradiating a polymerizable composition including a liquid crystal compound with light to polymerize the liquid crystal compound. The polymerizable composition may include a liquid crystal compound having at least one polymerizable group and may be a composition obtained by polymerizing the liquid crystal compound with a polymerizable group by light irradiation. It is preferable that the polymerizable composition is applied to the alignment layer. It is particularly preferable that the polymerizable composition is directly applied to the alignment layer formed on the temporary support (for example, stretching film). The liquid crystal compound molecules in the layer can be aligned by further drying the coating layer at room temperature or the like or heating the coating layer (for example, heating at 50° C. to 150° C. and preferably at 80° C. to 120° C.). The optically anisotropic layer may be formed through polymerization fixation by light irradiation of the liquid crystal compound.

The thickness of the optically anisotropic layer may be 10 μm or less, less than 8 μm, 7 μm or less, 6 μm or less, 5 μm or less, 4 μm or less, 3 μm or less, 2 μm or less, 1.9 μm or less, 1.8 μm or less, 1.7 μm or less, 1.6 μm or less, 1.5 μm or less, 1.4 μm or less, 1.3 μm or less, 1.2 μm or less, 1.1 μm or less, or 1 μm or less, and 0.2 μm or more, 0.3 μm or more, 0.4 μm or more, 0.5 μm or more, 0.6 μm or more, 0.7 μm or more, 0.8 μm or more, or 0.9 μm or more. It is preferable that the thickness of the optically anisotropic layer is smaller than the thickness of the acrylic polymer layer.

[Two or More Optically Anisotropic Layers]

The optical film may include two or more optically anisotropic layers. Two or more optically anisotropic layers may be brought into direct contact with each other in the normal direction or another layer such as an alignment layer may be interposed therebetween. The polymerizable compositions forming two or more layers may be the same or maybe different from each other. For example, the combination of two or more optically anisotropic layers may be a combination of layers formed of a composition including a rod-like liquid crystal compound, a combination of layers composed of a composition including a disk-like liquid crystal compound, or a combination of a layer composed of a composition including a rod-like liquid crystal compound and a layer composed of a composition including a disk-like liquid crystal compound. When the optical film includes two or more optically anisotropic layers, an optically anisotropic layer prepared in advance may function as an alignment layer of an optically anisotropic layer to be formed later. At this time, the optically anisotropic layer formed in advance may be rubbed. When the polarizing plate includes two or more optically anisotropic layers, it is preferable that a total of the thicknesses of the optically anisotropic layers is the above-mentioned thickness.

Two optically anisotropic layers may have a function as, for example, a λ/4 phase difference plate. The λ/4 phase difference plate functions as a circular polarizing plate in combination with a polarizer (linear polarizer).

The phase difference plate has numerous applications and has been already used for a reflection type LCD, a semi-transmission type LCD, a luminance improving film, an organic EL display device, a touch panel and the like. For example, since an organic EL (organic electroluminescence) element has a structure in which layers having different refractive indexes are laminated or a structure using a metal electrode, light from outside is reflected at the interface between each layer, which causes problems of a reduction in contrast and reflected glare in some cases. In the related art, in order to suppress an adverse effect caused by reflection of light from outside, a circular polarizing plate including a phase difference plate and a polarizing film has been used for an organic EL display device, an LCD display device and the like.

[Liquid Crystal Compound]

As the liquid crystal compound, a rod-like liquid crystal compound and a disk-like liquid crystal compound can be used.

As the rod-like liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolans and alkcnylcyclohexylbenzonitriles are preferably used. Not only these low molecular weight liquid crystal molecules but also a polymer liquid crystal molecules can be used.

It is more preferable that the alignment of the rod-like liquid crystal compound is fixed by polymerization. As the polymerizable rod-like liquid crystal compound, the compounds described in Makromol. Chem., Vol. 190, p. 2255 (1989), Advanced Materials, Vol. 5, p. 107 (1993), U.S. Pat. No. 4,683,327A, U.S. Pat. No. 5,622,648A, and U.S. Pat. No. 5,770,107A WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-64627, and the like can be used. In addition, as the polymerizable rod-like liquid crystal compound, a polymerizable rod-like liquid crystal compound represented by Formula (1) below is preferable.

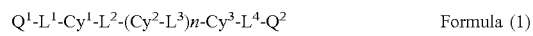

$$Q^1\text{-}L^1\text{-}Cy^1\text{-}L^2\text{-}(Cy^2\text{-}L^3)n\text{-}Cy^3\text{-}L^4\text{-}Q^2 \qquad \text{Formula (1)}$$

(In Formula (1), $Q^1$ and $Q^2$ each independently are a polymerizable group, $L^1$ and $L^4$ each independently are a divalent linking group, $L^2$ and $L^3$ each independently are a single bond or a divalent linking group, $Cy^1$, $Cy^2$ and $Cy^3$ each represent a divalent cyclic group, and n represents 0, 1, 2 or 3.)

The polymerizable rod-like liquid crystal compound represented by Formula (1) will be further described.

In Formula (1), $Q^1$ and $Q^2$ each independently are a polymerizable group. The polymerization reaction of the polymerizable group is preferably an addition polymerization (including a ring-opening polymerization) or a condensation polymerization. In other words, the polymerizable group is preferably a functional group capable of undergoing an addition polymerization reaction or a condensation polymerization reaction. Examples of the polymerizable group are shown below.

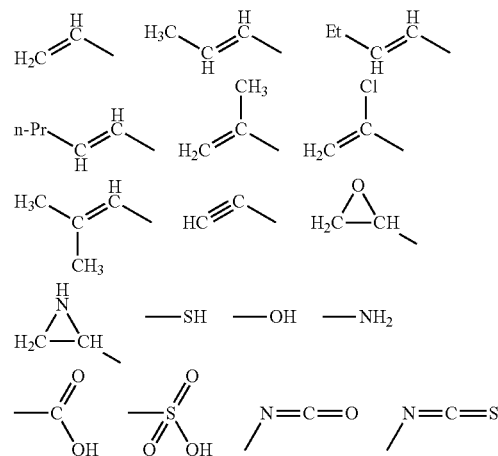

Among these, examples of a preferable polymerizable group include an acrylic group and a methacrylic group. Particularly, it is preferable that both $Q^1$ and $Q^2$ in Formula (1) are acrylic groups or methacrylic groups. The adhesiveness with the acrylic polymer layer formed by curing a polymerizable composition including (meth)acrylate is likely to be improved by using these groups.

In Formula (1), $L^1$ and $L^4$ each independently represent a divalent linking group. $L^1$ and $L^4$ each independently are preferably a divalent linking group selected from the group consisting of —O—, —S—, —CO—, —NR—, —C=N—, a divalent chain group, a divalent cyclic group and a combination thereof. The R is an alkyl group having from 1 to 7 carbon atoms or a hydrogen atom. R is preferably an alkyl group having from 1 to 4 carbon atoms or a hydrogen atom, more preferably a methyl group, an ethyl group, or a hydrogen atom, and still more preferably a hydrogen atom.

Examples of the divalent linking group constituted by a combination are shown below. Here, the left side is bonded to Q ($Q^1$ or $Q^2$) and the right side is bonded to Cy ($Cy^1$ or $Cy^3$).

L-1: —CO—O-divalent chain group-O—
L-2: —CO—O-divalent chain group-O—CO—
L-3: —CO—O-divalent chain group-O—CO—O—
L-4: —CO—O-divalent chain group-O-divalent cyclic group-
L-5: —CO—O-divalent chain group-O-divalent cyclic group-CO—O—
L-6: —CO—O-divalent chain group-O-divalent cyclic group-O—CO—
L-7: —CO—O-divalent chain group-O-divalent cyclic group-divalent chain group-
L-8: —CO—O-divalent chain group-O-divalent cyclic group-divalent chain group-CO—O—
L-9: —CO—O-divalent chain group-O-divalent cyclic group-divalent chain group-O—CO—
L-10: —CO—O-divalent chain group-O—CO-divalent cyclic group-
L-11: —CO—O-divalent chain group-O—CO-divalent cyclic group-CO—O—
L-12: —CO—O-divalent chain group-O—CO-divalent cyclic group-O—CO—
L-13: —CO—O-divalent chain group-O—CO-divalent cyclic group-divalent chain group-
L-14: —CO—O-divalent chain group-O—CO-divalent cyclic group-divalent chain group-CO—O—
L-15: —CO—O-divalent chain group-O—CO-divalent cyclic group-divalent chain group-O—CO—
L-16: —CO—O-divalent chain group-O—CO—O-divalent cyclic group-
L-17: —CO—O-divalent chain group-O—CO—O-divalent cyclic group-CO—O—
L-18: —CO—O-divalent chain group-O—CO—O-divalent cyclic group-O—CO—
L-19: —CO—O-divalent chain group-O—CO—O-divalent cyclic group-divalent chain group-
L-20: —CO—O-divalent chain group-O—CO—O-divalent cyclic group-divalent chain group —CO—O—
L-21: —CO—O-divalent chain group-O—CO—O-divalent cyclic group-divalent chain group —O—CO—

The divalent chain group means an alkylene group, a substituted alkylene group, an alkenylene group, a substituted alkenylene group, an alkynylene group or a substituted alkynylene group. The divalent chain group is preferably an alkylene group, a substituted alkylene group, an alkenylene group or a substituted alkenylene group, and more preferably an alkylene group or an alkenylene group.

The alkylene group may have a branch. The number of carbon atoms in the alkylene group is preferably from 1 to 12, more preferably from 2 to 10, and still more preferably from 2 to 8.

The alkenylene moiety of the substituted alkenylene group is the same as the above-described alkenylene group. Examples of the substituent include a halogen atom.

The alkenylene group may have a branch. The number of carbon atoms in the alkenylene group is preferably from 2 to 12, more preferably from 2 to 10, and still more preferably from 2 to 8.

The alkylene moiety of the substituted alkylene group is the same as the above-described alkylene group. Examples of the substituent include a halogen atom.

The alkynylene group may have a branch. The number of carbon atoms in the alkynylene group is preferably from 2 to 12, more preferably from 2 to 10, and still more preferably from 2 to 8.

The alkynylene moiety of the substituted alkynylene group is the same as the above-described alkynylene group. Examples of the substituent include a halogen atom.

Specific examples of the divalent chain group include ethylene, trimethylene, propylene, tetramethylene, 2-methyl-tetramethylene, pentamethylene, hexamethylene, octamethylene, 2-butenylene, and 2-butynylene.

The definition and examples of the divalent cyclic group are the same as the definition and examples of $Cy^1$, $Cy^2$ and $Cy^3$ described later.

In Formula (1), $L^2$ and $L^3$ each independently are a single bond or a divalent linking group. $L^2$ and $L^3$ each independently are preferably a divalent linking group selected from the group consisting of —O—, —S—, —CO—, —NR—, —C=N—, a divalent chain group, a divalent cyclic group and a combination thereof. The R is an alkyl group having from 1 to 7 carbon atoms or a hydrogen atom, preferably an alkyl group having from 1 to 4 carbon atoms or a hydrogen atom, more preferably a methyl group, an ethyl group, or a hydrogen atom, and still more preferably a hydrogen atom. The divalent chain group and divalent cyclic group are the same as those in the definition of $L^1$ and $L^4$.

Examples of a preferable divalent linking group of $L^2$ or $L^3$ include —COO—, —OCO—, —OCOO—, —OCONR—, —COS—, —SCO—, —CONR—, —NRCO—, —CH$_2$CH$_2$—, —C=C—COO—, —C=N—, and —C=N—N=C—.

In Formula (1), n is 0, 1, 2 or 3. When n is 2 or 3, two $L^3$s may be the same or different from each other and two $Cy^2$s may be the same or different from each other. n is preferably 1 or 2 and more preferably 1.

In Formula (1), $Cy^1$, $Cy^2$ and $Cy^3$ each independently are a divalent cyclic group.

The ring contained in the cyclic group is preferably a 5-, 6- or 7-membered ring, more preferably a 5- or 6-membered ring, and most preferably a 6-membered ring.

The ring contained in the cyclic group may be a condensed ring, but the ring is more preferably a monocyclic ring rather than a condensed ring.

The ring contained in the cyclic group may be an aromatic ring, an aliphatic ring or a heterocyclic ring. Examples of the aromatic ring include a benzene ring and a naphthalene ring. Examples of the aliphatic ring include a cyclohexane ring. Examples of the heterocyclic ring include a pyridine ring and a pyrimidine ring.

Preferred examples of the cyclic group having a benzene ring include 1,4-phenylene. Preferred examples of the cyclic group having a naphthalene ring include naphthalene-1,5-diyl and naphthalene-2,6-diyl. Preferred examples of the cyclic group having a cyclohexane ring include 1,4-cyclohexylene. Preferred examples of the cyclic group having a pyridine ring include pyridine-2,5-diyl. Preferred examples of the cyclic group having a pyrimidine ring include pyrimidine-2,5-diyl.

The cyclic group may have a substituent. Examples of the substituent include a halogen atom, a cyano group, a nitro group, an alkyl group having from 1 to 5 carbon atoms, a halogen-substituted alkyl group having from 1 to 5 carbon atoms, an alkoxy group having from 1 to 5 carbon atoms, an alkylthio group having from 1 to 5 carbon atoms, an acyloxy group having from 2 to 6 carbon atoms, an alkoxycarbonyl group having from 2 to 6 carbon atoms, a carbamoyl group, an alkyl-substituted carbamoyl group having from 2 to 6 carbon-atoms, and an acylamino group having from 2 to 6 carbon atoms.

Examples of the polymerizable rod-like liquid crystal compound represented by Formula (1) will be shown below but the examples of the polymerizable rod-like liquid crystal compound are not limited to these.

I-1)

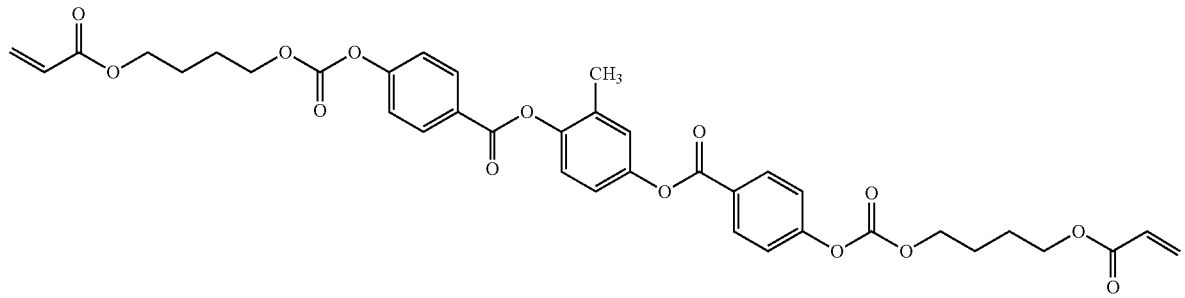

I-2)

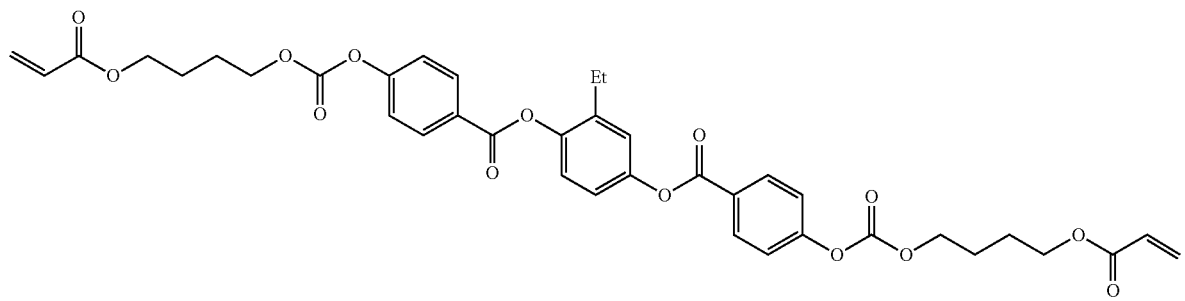

I-3)

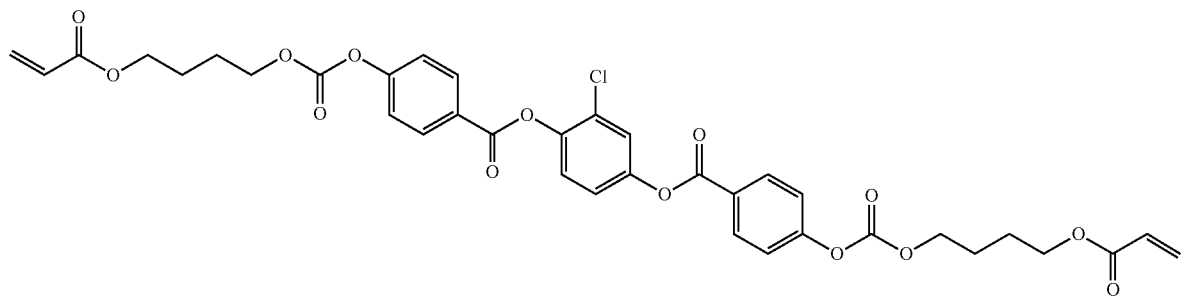

I-4)

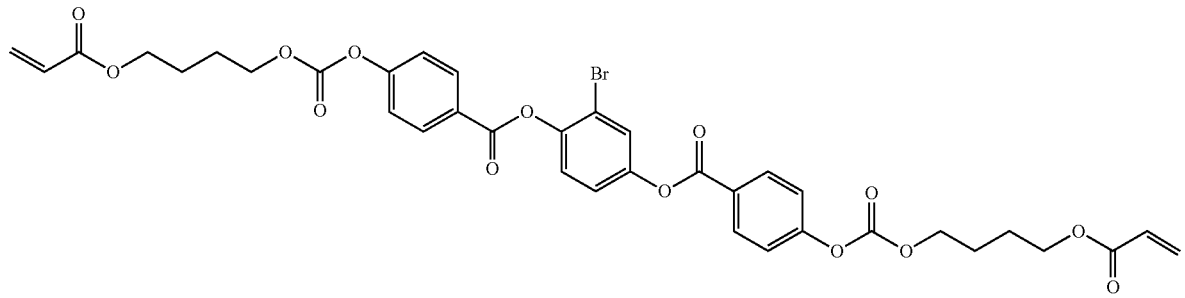

-continued
I-5)
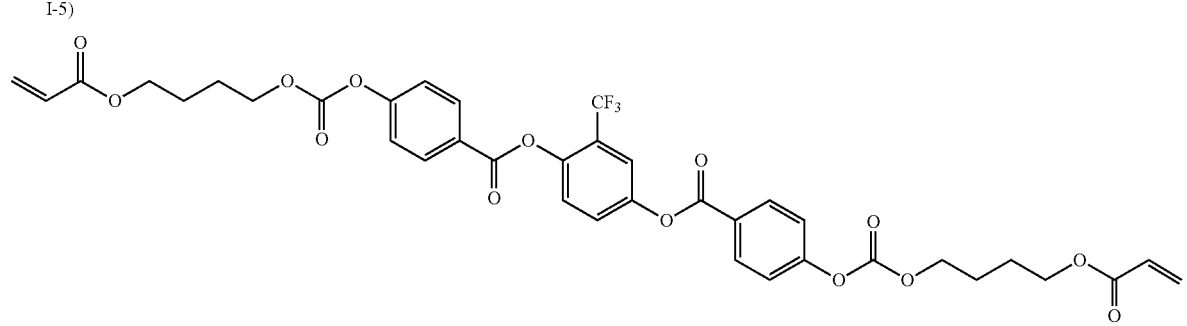
I-6)
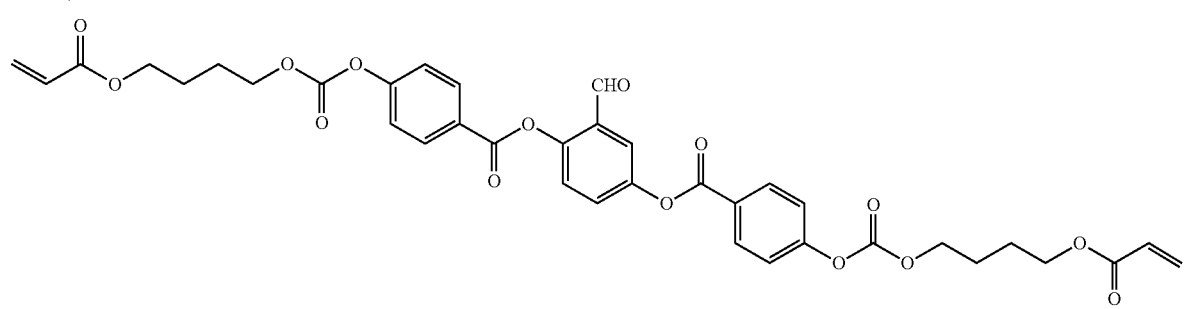
I-7)
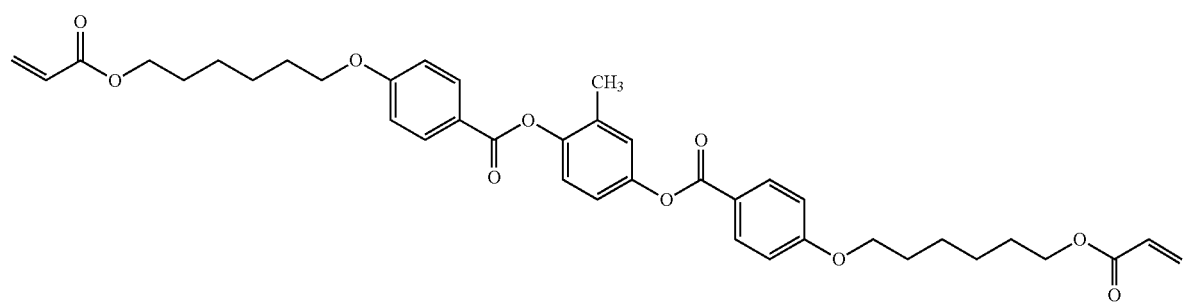
I-8)
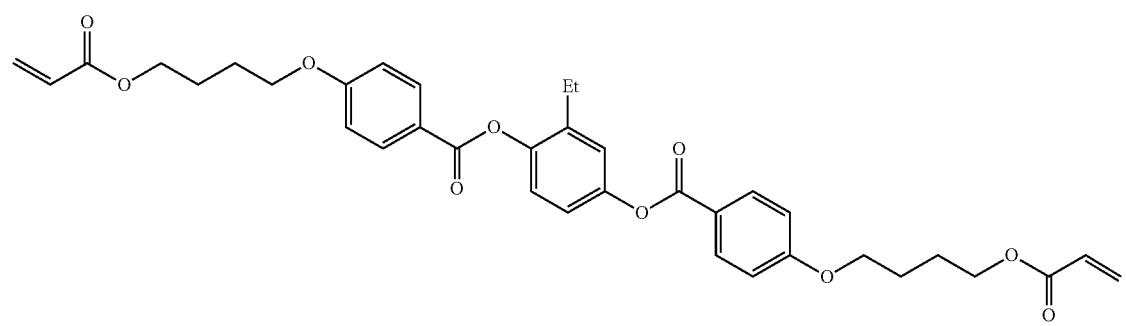
I-9)
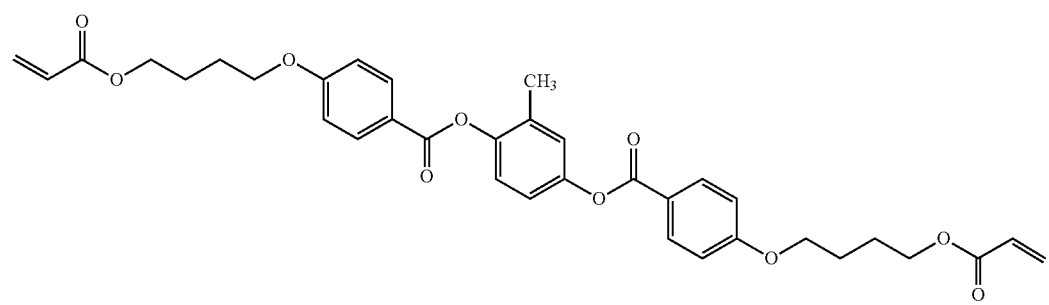

I-10)
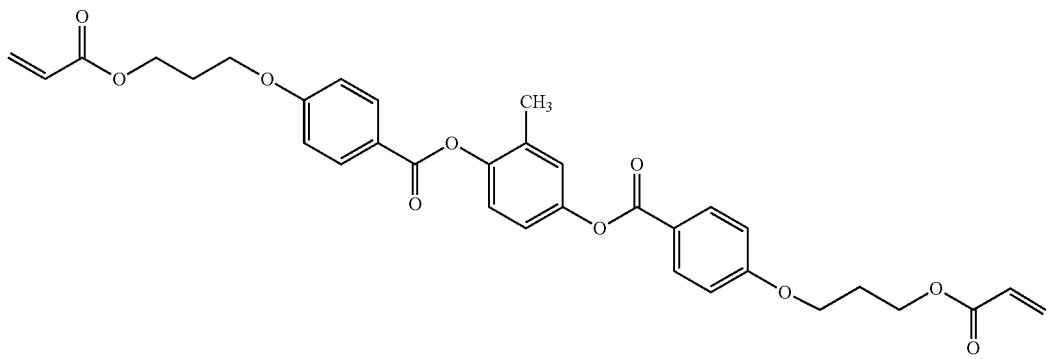
I-11)
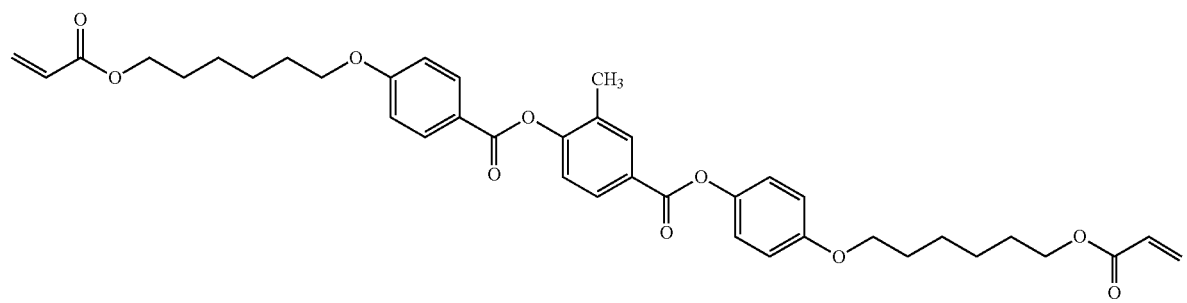
I-12)
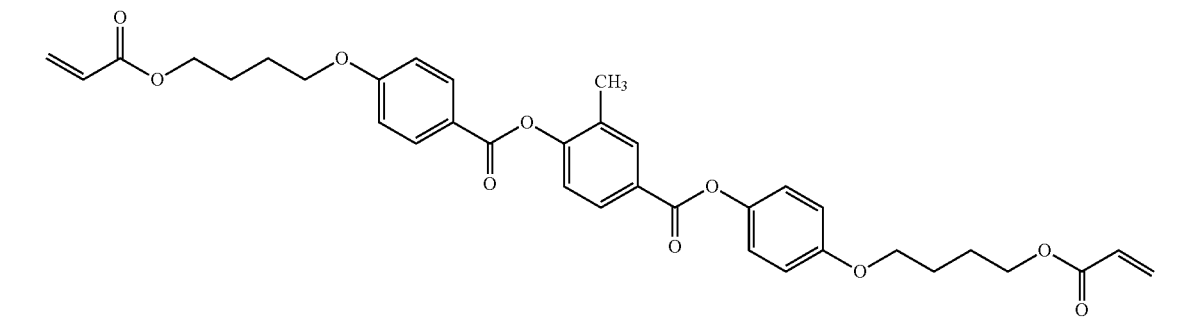
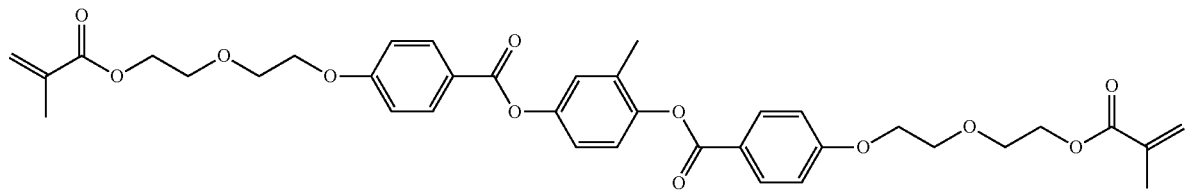
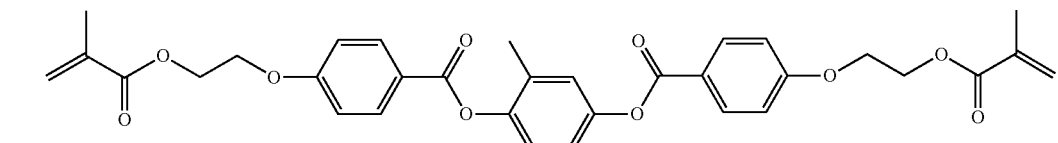
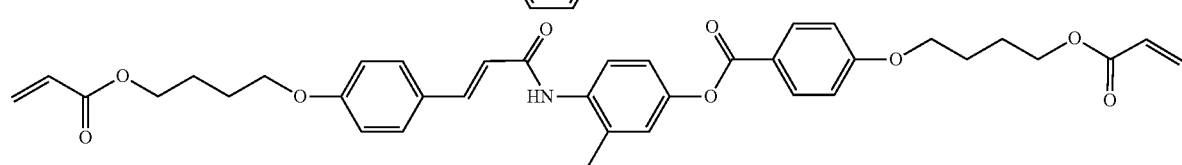
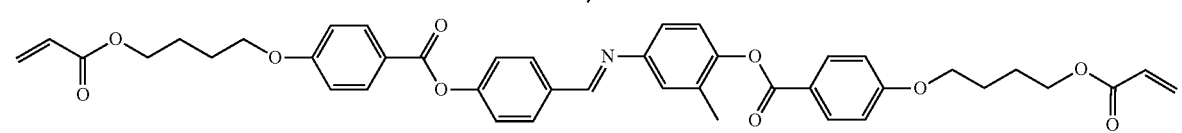

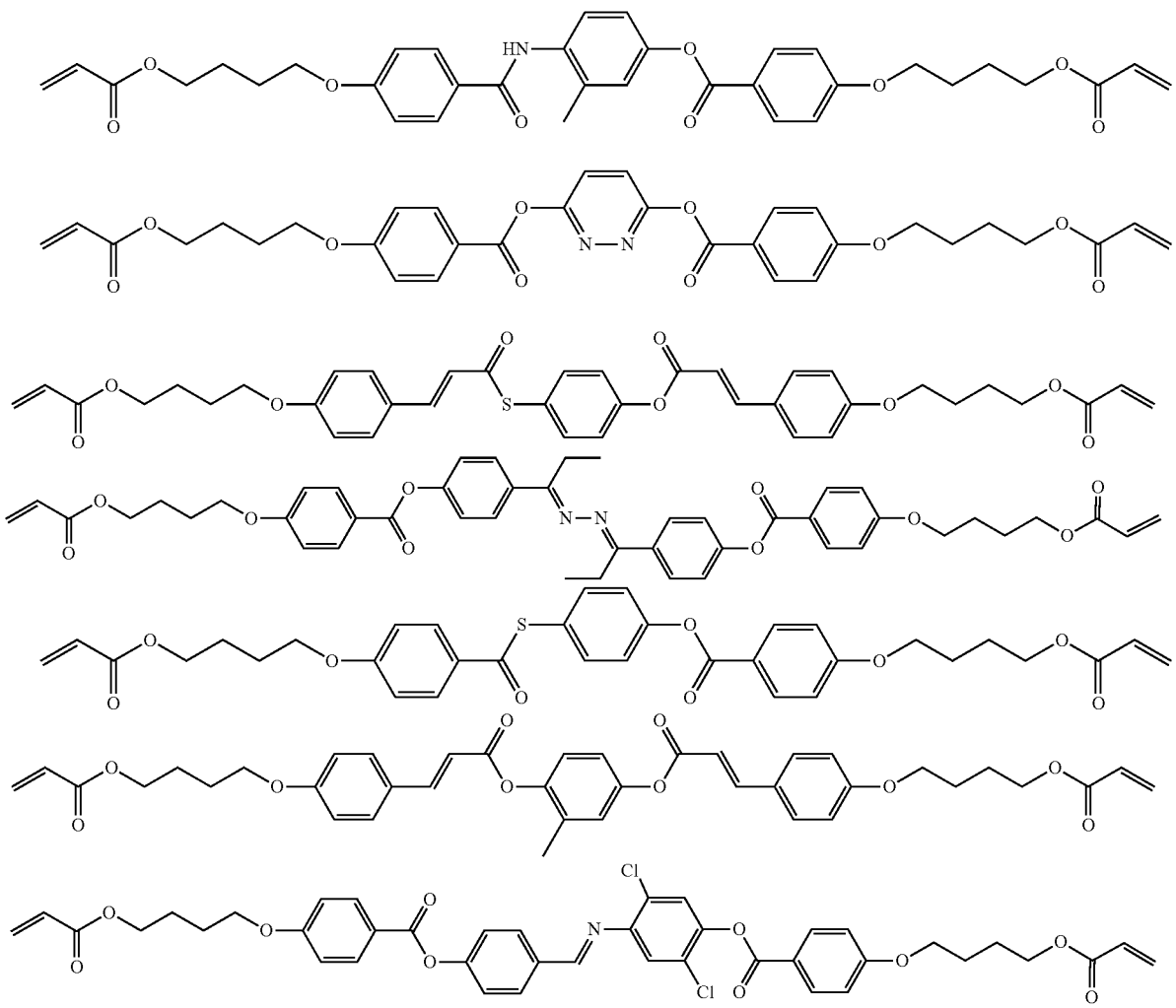

In addition, as the rod-like liquid crystal compound, it is preferable that at least one of compounds represented by Formula (2) below is also used in addition to the polymerizable rod-like liquid crystal compound represented by Formula (1).

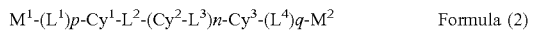

(In Formula (2), $M^1$ and $M^2$ each independently represent a hydrogen atom, a substituted or unsubstituted alkyl group, a substituted or unsubstituted aryl group, a heterocyclic group, a cyano group, a halogen, —SCN, —$CF_3$, a nitro group, or $Q^1$, but at least one of $M^1$ and $M^2$ represents a group other than $Q^1$. However, $Q^1$, $L^1$, $L^2$, $L^3$, $L^4$, $Cy^1$, $Cy^2$, $Cy^3$ and n are the same groups represented by Formula (1). In addition, p and q are 0 or 1.)

When $M^1$ and $M^2$ do not represent $Q^1$, each of $M^1$ and $M^2$ is preferably a hydrogen atom, a substituted or unsubstituted alkyl group, a substituted or unsubstituted aryl group, or a cyano group and more preferably an alkyl group having 1 to 4 carbon atoms or a phenyl group, and p and q are preferably 0.

Further, in the mixture of the polymerizable rod-like liquid crystal compound represented by Formula (1) and the compound represented by Formula (2), a preferable mixing ratio (mass ratio) of the compound represented by Formula (2) is preferably 0.1% to 40%, more preferably 1% to 30%, and still more preferably 5% to 20%.

Preferable examples of the compound represented by Formula (2) will be shown below but the present invention is not limited to these examples.

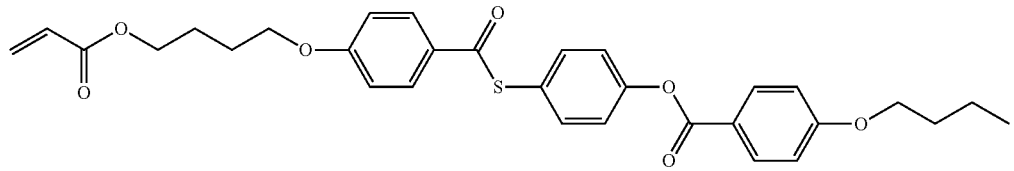

-continued
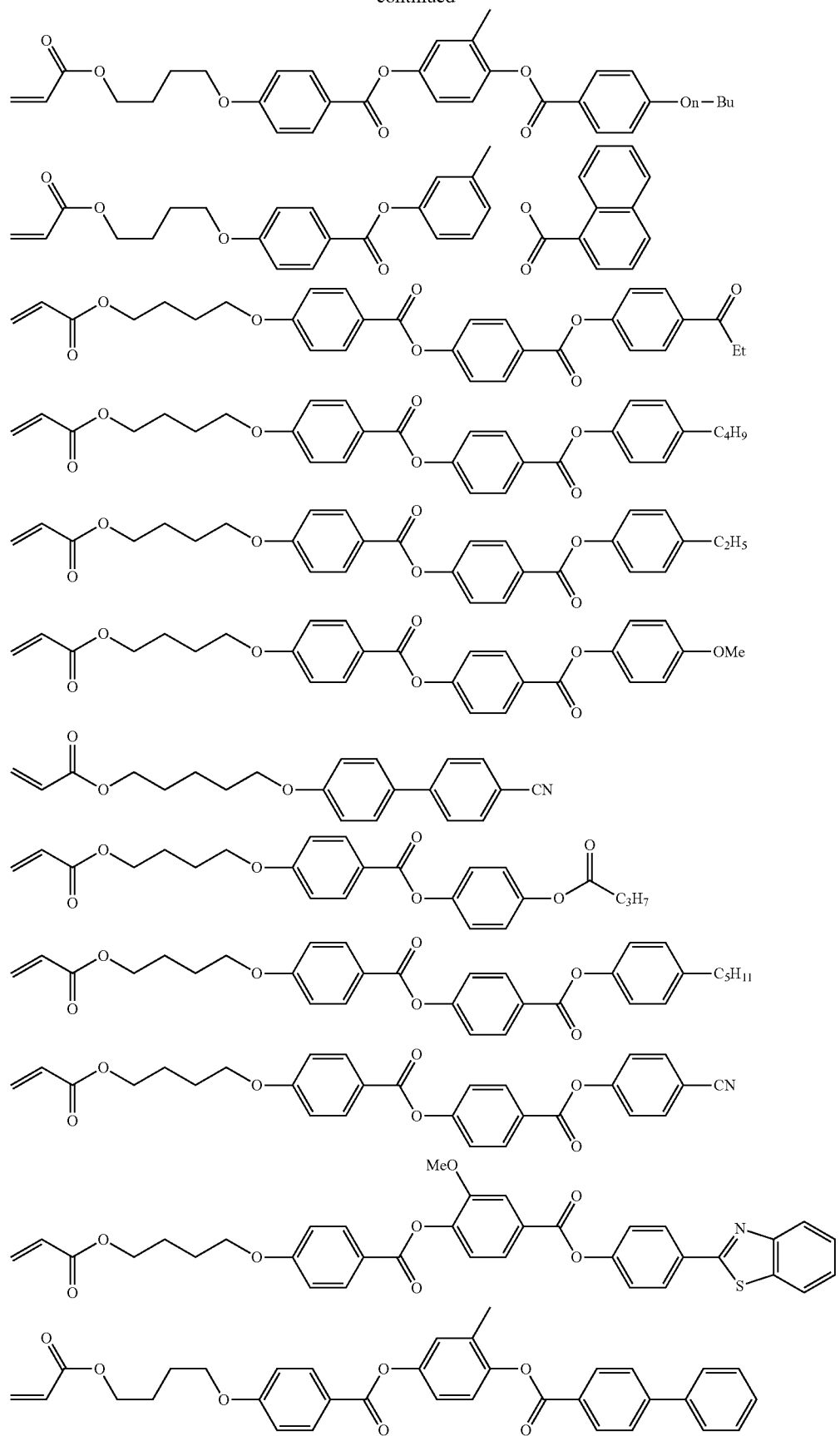

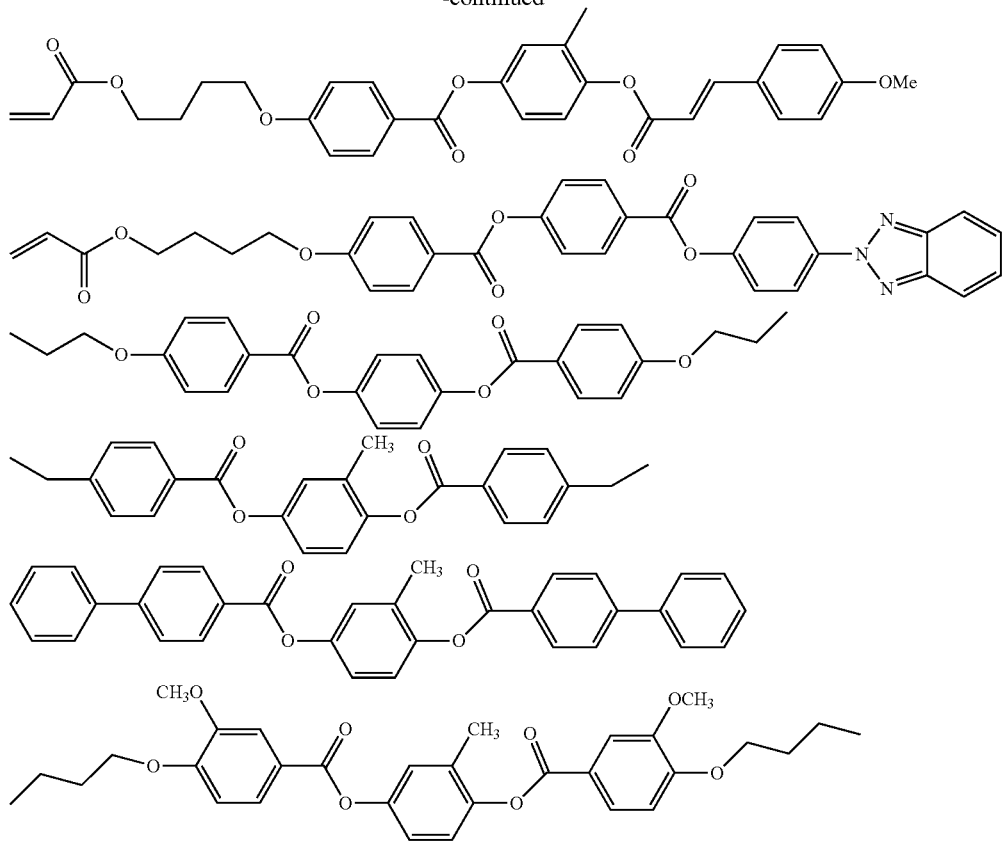

The disk-like liquid crystal compound is described in various documents (C. Destrade et al., Mol. Crysr. Liq. Cryst., vol. 71, page 111 (1981); The Chemical Society of Japan, Kikan Kagaku Sosetsu, No. 22, Chemistry of Liquid Crystal, Chapter 5, and Chapter 10, Section 2. (1994); B. Kohne et al., Angew, Chem. Soc. Chem. Comm., p. 1794 (1985); and J. Zhang et al., J. Am. Chem. Soc., Vol. 116, page 2655 (1994)). The polymerization of the disk-like liquid crystal compound is described in JP1996-27284A (JP-H08-27284A). In order to fix the disk-like liquid crystal compound, a polymerizable group has to be bonded as a substituent to the disc-like core of disk-like liquid crystal compound. However, when a polymerizable group is directly bonded to the disc-like core, it is difficult to maintain the alignment state in the polymerization reaction. Therefore, a linking group is introduced between the disc-like core and the polymerizable group. That is, the photocuring type disk-like liquid crystal compound is preferably a compound represented by Formula (3) below:

D(-L-P)n                              Formula (3)

(In Formula (3), D is a disc-like core, and L is a divalent linking group, P is a polymerizable group, and n is an integer of 4 to 12.)

Preferable specific examples of each of the disc-like core (D), the divalent linking group (L), and the polymerizable group (P) in Formula (3) are (D1) to (D15), (L1) to (L25), and (P1) to (P18) disclosed in JP2001-4837A and the contents in JP2001-4837A can be preferably used.

In addition, as the disk-like liquid crystal compound, a compound represented by Formula (DI) disclosed in JP2007-2220A is preferably used.

The content of the liquid crystal compound may be 80% by mass or more, 90% by mass or more, or 95% by mass or more, and 99.99% by mass or less, 99.98% by mass or less, or 99.97% by mass or less with respect to the solid content mass of the polymerizable composition (mass excluding the solvent). Particularly, the content of a compound including an acrylic group or a methacrylic group is preferably 70% by mass or more, 80% by mass or more, 90% by mass or more, or 95% by mass or more, and 99.99% by mass or less, 99.98% by mass or less, or 99.97% by mass or less.

The liquid crystal compound may be fixed in any state of alignment of horizontal alignment, vertical alignment, tilt alignment and twisted alignment. In addition, the "horizontal alignment" in the present specification means that in the case of a rod-like liquid crystal, the molecular long axes thereof and the horizontal plane of the transparent support are parallel to each other, and in the case of a disk-like liquid crystal, the disc-like plane of the core of the disk-like liquid crystal compound and the horizontal plane of the transparent support are parallel to each other. However, these are not required to be exactly parallel to each other, and, in the present specification, the term "horizontal alignment" should be understood as an alignment state in which molecules are aligned with a tilt angle with respect to a horizontal plane of less than 10 degrees. The optically anisotropic layer in the optical film material of the present invention preferably includes the rod-like liquid crystal compound fixed in a state of horizontal alignment.

[Solvent]

As a solvent used for preparation of a coating solution when the composition containing the liquid crystal compound is used to prepare a coating solution, an organic solvent, water, or a mixed solvent thereof is preferably used. Examples of the organic solvent include amides (for example, N,N-dimethylformamide), sulfoxides (for example, dimethyl sulfoxide), heterocyclic compounds (for example, pyridine), hydrocarbons (for example, benzene and hexane), alkyl halides (for example, chloroform and dichloromethane), esters (for example, methyl acetate and butyl acetate), ketones (for example, acetone, methyl ethyl ketone, methyl isobutyl ketone, and cyclohexanone), ethers (for example, tetrahydrofuran and 1,2-dimethoxyethane), and alkyl alcohols (for example, methanol, ethanol, and propanol). In addition, two or more types of organic solvents may be used in a mixture. Among these, alkyl halides, esters, ketones, and a mixed solvent thereof are preferable.

[Alignment Fixation]

The polymerization reaction of the liquid crystal compound may be a photopolymerization reaction. As the photopolymerization reaction, any of radical polymerization and cationic polymerization may be employed but radical polymerization is preferable. Examples of radical photopolymerization initiators include α-carbonyl compounds (described in each of U.S. Pat. No. 2,367,661A and U.S. Pat. No. 2,367,670A), acyloin ethers (described in U.S. Pat. No. 2,448,828A), α-hydrocarbon substituted aromatic acyloin compounds (described in U.S. Pat. No. 2,722,512A), polynuclear quinone compounds (described in U.S. Pat. No. 3,046,127A and U.S. Pat. No. 2,951,758A), a combination of triaryl imidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A) and oxadiazole compounds (described in U.S. Pat. No. 4,212,970A). Examples of cationic photopolymerization initiators include organic sulfonium salts, iodonium salts, and phosphonium salts. The organic sulfonium salts are preferable and triphenylsulfonium salts are particularly preferable. Hexafluoroantimonate, hexafluorophosphate, and the like are preferably used as the counter ions of these compounds.

The amount of the photopolymerization initiator used is preferably 0.01% by mass to 20% by mass and more preferably 0.5% by mass to 5% by mass with respect to the solid content of the coating solution. The light irradiation for the polymerization of the liquid crystal compound is preferably performed by using ultraviolet light. The irradiation energy is preferably from 10 mJ/cm$^2$ to 10 J/cm$^2$ and more preferably from 25 mJ/cm$^2$ to 1,000 mJ/cm$^2$. In order to accelerate the photopolymerization reaction, the light irradiation may be performed under heating. The illuminance is preferably 10 mW/cm$^2$ to 2,000 mW/cm$^2$, more preferably 20 mW/cm$^2$ 1,500 mW/cm$^2$, and still more preferably 40 mW/cm$^2$ 1,000 mW/cm$^2$. The irradiation wavelength peak is preferably 250 nm to 450 nm and more preferably 300 nm to 410 nm. In order to promote the photopolymerization reaction, the light irradiation may be performed under an inert gas atmosphere such as nitrogen or under heated conditions.

[Horizontal Alignment Agent]

By incorporating, in the polymerizable composition including the liquid crystal compound, at least one of fluorine containing homopolymers or copolymers which is represented by a compound represented by Formulae (1) to (3) and a monomer of Formula (4) described in JP2009-69793A, paragraphs "0098" to "0105", molecules of the liquid crystal compound can be aligned substantially horizontally. When the liquid crystal compound is to be aligned horizontally, the tilt angle thereof is preferably 0 degrees to 5 degrees, more preferably 0 degrees to 3 degrees, still more preferably 0 degrees to 2 degrees, and most preferably 0 degrees to 1 degree.

The amount of the horizontal alignment agent added is preferably 0.01% by mass to 20% by mass of the mass of the liquid crystal compound, more preferably 0.01% by mass to 10% by mass, and particularly preferably 0.02% by mass % to 1% by mass. The compound represented by Formulae (1) to (4) described in JP2009-69793A, paragraphs "0098" to "0105" may be used alone, or in combination of two or more thereof.

[Other Additives]

The polymerizable composition including the liquid crystal compound may include a pyridinium compound represented by Formula (I) disclosed in JP2006-113500A. The pyridinium compound can function as an alignment layer interface side vertical alignment agent, and for example, molecules of the discotic liquid crystal compound can be aligned substantially vertically near the alignment layer. The polymerizable composition including the liquid crystal compound may include a boronic acid compound represented by Formula (I) disclosed in JP2013-054201A.

The polymerizable composition including the liquid crystal compound may include other necessary additives but it is preferable that the composition does not include a so-called chiral agent.

[Alignment Layer]

The optical film used in the present invention includes an alignment layer. The alignment layer may be provided on the temporary support (stretched film) or on the surface of an undercoat applied to the temporary support. The aligmnent layer has a function of defining the alignment of the liquid crystal compound in the polymerizable composition provided thereon. The alignment layer may be any layer as long as the layer can impart alignment properties to the optically anisotropic layer. Preferable examples of the alignment layer include a layer of an organic compound (preferably a polymer) which has been subjected to a rubbing treatment, a photo alignment layer that shows alignment properties of a liquid crystal due to irradiation with polarized light represented by azobenzene polymer and polyvinyl cinnamate, an oblique vapor deposition layer of an inorganic compound, and a layer having microgrooves, furthermore, a built-up film of ω-tricosanoic acid, dioctadecylmethylammonium chloride, methyl stearate or the like which are formed by a Langmuir-Blodgett method (LB film), or a layer in which a dielectric has been aligned by providing an electric field or a magnetic field. In the alignment layer, polyvinyl alcohol is preferably contained through a rubbing mode, and, particularly preferably, the alignment layer can be crosslinked with at least either one of an upper layer or a lower layer thereof. A photoalignment layer and microgrooves are preferable as a method for controlling an alignment direction. As the photoalignment layer, one that can show alignment properties by dimerization such as polyvinyl cinnamate is particularly preferable, and for the microgroove, an emboss treatment with a master roll produced by mechanical processing or laser processing in advance is particularly preferable.

The rubbing treatment can be generally performed by rubbing the surface of a film having a polymer as a main component with paper or fabric in a predetermined direction. A general method for a rubbing treatment is described, for example, in "Liquid Crystal Handbook" (published by Maruzen Co., Ltd., Oct. 30, 2000).

Regarding the method for changing the rubbing density, the method described in "Liquid Crystal Handbook" (published by Maruzen Co., Ltd.) can be used. The rubbing density (L) is quantified by Equation (A) below:

$$L=N1(1+2\pi rn/60v)$$ Equation (A)

In Equation (A), N represents the rubbing frequency, 1 represents the contact length of the rubbing roller, r represents the radius of the roller, n represents the rotation number of the roller (rpm), and v represents the stage moving speed (per second).

For increasing the rubbing density, the rubbing frequency is increased, the contact length of the rubbing roller is prolonged, the radius of the roller is increased, the rotation number of the roller is increased, or the stage moving speed is lowered; but on the contrary, for decreasing the rubbing density, the above may be reversed.

In addition, as the conditions for the rubbing treatment, the description of JP4052558B can be referred to.

[Acrylic Polymer Layer]

The optical film used in the present invention includes an acrylic polymer layer formed by curing a polymerizable composition including (meth)acrylate. As the acrylic polymer layer in the optical film, a layer formed by directly applying the polymerizable composition including (meth) acrylate monomers to the surface of the optically anisotropic layer or the optically anisotropic layer before curing is used. In the specification, the optically anisotropic layer or the optically anisotropic layer before curing is referred to as "a layer formed from a polymerizable composition including a liquid crystal compound" in some cases.

As the acrylic polymer layer, any layer may be used as long as the layer is an optically isotropic layer. The term of "optically isotropic" means that the absolute value of the in-plane retardation (Re (550)) is 10 nm or less and the absolute value of the retardation in the thickness direction (Rth) is 10 nm or less.

The optically isotropic acrylic polymer layer may be any layer as long as the layer does not correspond to, for example, a polymer layer that can be obtained by polymerizing a liquid crystal compound having an acrylate group and the content of the liquid crystal compound in the polymerizable composition including (meth)acrylate for forming the acrylic polymer layer is preferably less than 80% by mass, less than 70% by mass, less than 60% by mass, less than 50% by mass, less than 40% by mass, less than 30% by mass, less than 20% by mass, less than 10% by mass, less than 5% by mass, or less than 1% by mass in terms of solid content.

(Meth)acrylate in the polymerizable composition including (meth)acrylate for forming the acrylic polymer layer is not particularly limited and any compound can be used as long as the compound is a compound including an acryloyl group or a methacryloyl group. The number of the acryloyl groups or methacryloyl groups in the compound may be one or two or more (for example, two, three, or four). The molecular weight of the (meth)acrylate may be about 5,000 or less, and is preferably 3,000 or less, more preferably 2,000 or less, and particularly preferably 1,000 or less. Examples of the (meth)acrylate include (meth)acrylic acids, various esters of (meth)acrylic acid (methyl(meth)acrylate and the like).

The polymerizable composition including (meth)acrylate for forming the acrylic polymer layer may include polymerizable compounds other than (meth)acrylate.

Examples of the acrylic polymer include polymethyl (meth)acrylate, copolymers of (meth)acrylic acid and various esters of (meth)acrylic acid, copolymers of styrene and (meth)acrylic acid or various (meth)acrylic acid esters, and copolymers of vinyl toluene and (meth)acrylic acid or various (meth)acrylic acid esters. Preferable examples thereof include a copolymer of methyl (meth)acrylate and (meth)acrylic acid, a copolymer of allyl(meth)acrylate and (meth)acrylic acid, and multicomponent copolymers of benzyl(meth)acrylate, (meth)acrylic acid and another monomer. These polymers may be used alone, or in combination of a plurality of kinds.

The acrylic polymer layer may be obtained by thermal polymerization or photopolymerization of (meth)acrylate and another monomer but it is particularly preferable that the acrylic polymer layer is obtained by photopolymerization. The photopolymerization reaction may be carried out on a coating layer formed by directly applying the polymerizable composition including (meth)acrylate to the layer formed from the polymerizable composition including a liquid crystal compound. Light irradiation for the photopolymerization reaction may be carried out under the same conditions as the conditions for light irradiation for the polymerization of the above-mentioned liquid crystal compound. The light irradiation for the polymerization of the liquid crystal compound may be carried out simultaneously with the polymerization of (meth)acrylate.

As a polymerization initiator, a thermal polymerization initiator or a photopolymerization initiator is appropriately used according to the method.

Examples of the photopolymerization initiator include a vicinal polyketaldonyl compound described in U.S. Pat. No. 2,367,660A, an acyloin ether compound described in U.S. Pat. No. 2,448,828A, an α-hydrocarbon-substituted aromatic acyloin compound described in U.S. Pat. No. 2,722,512A, polynuclear quinone compounds described in U.S. Pat. No. 3,046,127A and U.S. Pat. No. 2,951,758A, a combination of triarylimidazole dimer and p-aminoketone described in U.S. Pat. No. 3,549,367A, a benzothiazole compound and a trihalomethyl-s-triazine compound described in JP1976-48516B (JP-S51-48516B), a trihalomethyl-triazine compound described in U.S. Pat. No. 4,239,850A, and a trihalomethyl oxadiazole compound described in U.S. Pat. No. 4,212,976A. Particularly, trihalomethyl-s-triazine, trihalomethyl oxadiazole and triarylimidazole dimer are preferable. Furthermore, a suitable example includes a "polymerization initiator C" described in JP1999-133600A (JP-H11-133600A).

In addition, the amount of the polymerization initiator is preferably 0.01% by mass to 20% by mass of the solid content of the polymerizable composition for forming the acrylic polymer layer and more preferably 0.2% by mass to 10% by mass.

In order to impart hard coat properties to the acrylic polymer layer, as the polymer in the acrylic polymer layer, a polymer having a high Tg may be used. The Tg is preferably 50° C. or higher, more preferably 80° C. or higher, and still more preferably 100° C. or higher. In order to increase the Tg of the polymer, a polar group such as a hydroxyl group, a carboxylic acid group, or an amino group may be introduced. Examples of the polymer having a high Tg include reaction products of an alkyl (meth)acrylate such as polymethyl (meth)acrylate and polyethyl (meth)acrylate, a copolymer of alkyl (meth)acrylate and (meth)acrylic acid, reaction products of a hydroxyl group-containing (meth) acrylate such as 2-hydroxyethyl ethyl (meth)acrylate and 2-hydroxy propyl (meth)acrylate, and a copolymer of an alky (meth) acrylate and a half ester produced from a reaction product of a hydroxyl group-containing (meth) acrylate and an acid anhydride such as succinic acid anhydride and phthalic acid anhydride.

In addition, in order to impart hard coat properties, a layer formed by polymerizing a layer containing at least one polymerizable monomer and polymerizable polymer having two or more functional groups by irradiation of light or heat may be used. Examples of the reactive group include a vinyl group, an allyl group, an epoxy group, oxetanyl group, or a vinyl ether group as well as a (meth) acrylic group. Examples of the polymerizable polymer include a reaction product of a polymerizable group containing acrylate such as glycidyl (meth) acrylate, allyl (meth) acrylate, ethylene glycol di(meth) acrylate, and glycerol 1,3-di(meth) acrylate, a copolymer of a reaction product of a polymerizable group containing acrylate and (meth) acrylic acid, and multicomponent copolymers of the above-mentioned copolymers with other monomers.

In the composition for preparing the acrylic polymer layer, the same solvent as the solvent used for the above-mentioned polymerizing composition including a liquid crystal compound can be used.

The thickness of the acrylic polymer layer is preferably 60 µm or less, 50 µm or less, 40 µm or less, 30 µm or less, 25 µm or less, or 15 µm or less, and 2 µm or more, 3 µm or more, 3.5 µm or more, 4 µm or more, 4.5 µm or more, or 5 µm or more. In the optical film of the present invention, it is preferable that the thickness of the acrylic polymer layer is larger than the thickness of the optically anisotropic layer. When the thickness of the acrylic polymer layer is larger than the thickness of the optically anisotropic layer, a laminate including the acrylic polymer layer and the optically anisotropic layer can be easily peeled off from the temporary support. The ratio between the thickness of the acrylic polymer layer and the thickness of the optically anisotropic layer is not particularly limited. For example, the ratio of "thickness of acrylic polymer layer"/"thickness of optically anisotropic layer" may be about 6 to 1.1, and the ratio may be 6 to 5, 5 to 4, 4 to 3, 3 to 2, 2 to 1.5, and 1.5 to 1.1 according to the respective thicknesses. Usually, it is preferable that the smaller the thicknesses are, particularly, the smaller the thickness of the optically anisotropic layer is, the larger the ratio of "thickness of acrylic polymer layer"/"thickness of optically anisotropic layer" is. This is because when the thickness increases, the optically anisotropic layer is not easily broken and thus the thickness of the acrylic polymer layer does not have to be increased compared to the thickness of the optically anisotropic layer. For example, when the thickness of the optically anisotropic layer is about 0.1 µm to 1 µm, the ratio of "thickness of acrylic polymer layer"/"thickness of optically anisotropic layer" may be 6 to 4, and when the thickness of the optically anisotropic layer is about 3 the ratio of "thickness of acrylic polymer layer"/"thickness of optically anisotropic layer" may be 4 to 1.1.

[Coating Method]

The application of the composition when the optically anisotropic layer, the acrylic polymer layer, or the like is formed is performed by a dip coating method, an air knife coating method, a spin coating method, a slit coating method, a curtain coating method, a roller coating method, a wire bar coating method, a gravure coating method, and an extrusion coating method (described in U.S. Pat. No. 2,681, 294A). Two or more layers may be applied simultaneously. Methods for simultaneous coating are described in each of U.S. Pat. No. 2,761,791A, U.S. Pat. No. 2,941,898A, U.S. Pat. No. 3,508,947A, and U.S. Pat. No. 3,526,528A and Yuji Harazaki, "Coating Engineering," p 253, Asakura Publishing Co., Ltd. (1973).

[Method for Preparing Optical Film]

The optical film used in the present invention may be provided from an optical film material including a temporary support, an alignment layer, an optically anisotropic layer, and an acrylic polymer layer. In the specification, the optical film material means a material for supplying an optical film. Specifically, the optical film material may be any material as long as an optical film can be provided from the material (transport material) by peeling off the temporary support (for example, a layer formed from a stretching film).

It is preferable that the optical film material includes an acrylic polymer layer formed by curing a polymerizable composition including a temporary support, an alignment layer, an optically anisotropic layer, and (meth)acrylate. It is preferable that the optical film material include the temporary support, the alignment layer, the optically anisotropic layer, and the acrylic polymer layer in this order. In addition, it is preferable that the temporary support and the alignment layer, the alignment layer and the optically anisotropic layer, and the optically anisotropic layer and the acrylic polymer layer are brought into direct contact with each other. Further, it is particularly preferable that the alignment layer and the optically anisotropic layer, and the optically anisotropic layer and the acrylic polymer layer are brought into direct contact with each other.

[Temporary Support]

The temporary support is not particularly limited and a rigid support or a flexible support may be used. However, from the viewpoint of easy handling, a flexible support is preferable. The rigid support is not particularly limited and examples thereof include known glass plates such as a soda glass plate having a silicon oxide film on the surface thereof, low expansion glass, non-alkali glass, and a quartz glass plate, metal plates such as an aluminum plate, an iron plate, and a SUS plate, a resin plate, a ceramic plate, and a stone plate. The flexible support is not particularly limited and examples thereof include plastic films such as cellulose ester (for example, cellulose acetate, cellulose propionate, and cellulose butyrate), polyolefin (for example, norbornene polymers), poly(meth)acrylate (for example, polymethyl methacrylate), polycarbonate, polyester (for example, polyethylene terephthalate, and polyethylene naphthalate), polysulfone, and cycloolefin polymers (for example, norbornene resins (for example, Zeonex and Zeonoa, produced by Zeon Corporation, and Arton, produced by JSR Corporation)), paper, aluminium foils, and fabrics. Among these, polyethylene terephthalate (PET) is more preferable. From the viewpoint of ease of handling, the thickness of the rigid support is preferably 100 µm to 3,000 µm and more preferably 300 to 1,500 µm. The thickness of the flexible support may be about 5 µm to 1,000 µm, and is preferably 10 µm to 250 µm and more preferably 15 µm to 90 µm.

It is preferable that the temporary support is a stretching film described below.

[ Stretching Film]

The stretching film used for the optical film is not particularly limited and may be a uniaxially stretched film or a biaxially stretched film. However, the stretching film is preferably a uniaxially stretched film. The stretching film is preferably a stretched thermoplastic resin film. Preferable examples of the thermoplastic resin include polyester polymers such as polyethylene terephthalate, and cycloolefin polymers (for example, norbornene resins (such as Zeonex and Zeonoa, produced by Zeon Corporation, and Arton, produced by JSR Corporation)). Among these, polyethylene terephthalate (PET) is more preferable. The stretching conditions are not particularly limited. For example, stretching can be performed with reference to the description of JP2009-214441A.

The thickness of the layer composed of the stretching film may be about 10 μm to 1,000 μm, and is preferably 25 μm to 250 μm and more preferably 30 μm to 90 μm.

The optical film material may include other functional layers such as a layer of low moisture permeability, a protective layer, an antistatic layer, a hard coat layer, and an adhesive layer in addition to the above-described layer.

The optical film material can be prepared by, for example, any of the following production methods of [A] to [C].

[A] A production method including:
(1) providing an alignment layer on a temporary support,
(2) directly applying a polymerizable composition including a liquid crystal compound to the alignment layer,
(3) directly applying a polymerizable composition including (meth)acrylate to a layer formed from the polymerizable composition including a liquid crystal compound, and
(4) curing the polymerizable composition including a liquid crystal compound and the polymerizable composition including (meth)acrylate.

[B] The method according to [A], in which the curing is performed by photocuring.

[C] The method according to [B] including, in the following order:
(1) providing an alignment layer on a temporary support,
(2) directly applying a polymerizable composition including a liquid crystal compound to the alignment layer,
(2-2) forming an optically anisotropic layer by irradiating the polymerizable composition including a liquid crystal compound with light to polymerize the liquid crystal compound,
(3) directly applying the polymerizable composition including (meth)acrylate to the optically anisotropic layer, and
(3-2) forming an acrylic polymer layer by irradiating the polymerizable composition including (meth)acrylate with light to polymerize the (meth)acrylate.

[Polarizer]

As polarizers, there are known an iodine polarizer, a dye polarizer using a dichroic dye and a polyene polarizer. The iodine polarizer and the dye polarizer are generally formed using polyvinyl alcohol film. In the present invention, any polarizer may be used. For example, the polarizer is preferably composed of polyvinyl alcohol (PVA) and a dichroic molecule. Regarding the polarizer composed of polyvinyl alcohol (PVA) and a dichroic molecule, for example, the description of JP2009-237376A can be referred to. The thickness of the polarizer may be 50 μm or less, and is preferably 30 μm or less and more preferably 20 μm or less.

[Method for Preparing Polarizing Plate]

The polarizing plate used in the present invention can be produced, for example, as follows.

The above-described optical film material of the temporary support is peeled off and the optical film after the peeling-off of the temporary support is laminated on a film including a polarizer. Alternatively, the above-described optical film material is laminated on a film including a polarizer and then the temporary support is peeled off. In the case of laminating the optical film after peeling off the temporary support, any surface of the alignment layer or the acrylic polymer layer may be a surface on the side closer to the film including a polarizer. In the case of laminating the optical film material and then peeling off the temporary support, the lamination is performed such that the acrylic polymer layer becomes a surface on the side closer to the film including a polarizer. The lamination may be performed through an adhesive layer. The adhesive layer may be a layer including an adhesive or a gluing agent. That is, both films may be bonded or glued to each other with adhesive or a gluing agent. The adhesive is not particularly limited and examples thereof include a curable adhesive of an epoxy compound not including an aromatic ring in the molecule as shown in JP2004-245925A, an active energy ray curing adhesive having a photopolymerization initiator having a molar light absorption coefficient of 400 or more at a wavelength of 360 nm to 450 nm and an ultraviolet curable compound as essential components, described in JP2008-174667A, and an active energy ray curing adhesive containing (a) a (meth)acrylic compound having two or more (meth)acryloyl groups, (b) a (meth)acrylic compound having a hydroxyl group in the molecule and having only one polymerizable double bond, and (c) phenol ethylene oxide modified acrylate or nonylphenol ethylene oxide modified acrylate in the molecule in a total amount of 100 parts by mass of the (meth)acrylic compound described in JP2008-174667A.

The film including a polarizer on which the optical film material or the optical film is laminated may include only a polarizer and may include layers other than the polarizer such as a protective film.

[Protective Film (Protective Layer)]

It is preferable that the polarizing plate includes a protective film. For example, the protective film may be disposed on the other surface of the polarizer when the optical film is disposed on any one of surfaces of the polarizer. The protective film may be also disposed between the polarizer and the optical film. For the protective film, a cellulose acylate polymer film, an acrylic polymer film, or a cycloolefin polymer film can be used. Regarding the cellulose acylate polymer, the description of cellulose acylate resin of JP2011-237474A can be referred to. Regarding the cycloolefin polymer film, the descriptions of JP2009-175222A and JP2009-237376A can be referred to. By incorporating the cycloolefin polymer film in the polarizing plate, moisture permeability can be imparted to the polarizing plate of the present invention. The moisture permeability means a property of the plate that does not allow the permeation of water but allows the permeation of water vapor.

The thickness of the protective film may be 30 μm or less, and is preferably 20 μm or less and more preferably 10 μm or less.

[Hard Coat Layer]

The polarizing plate of the present invention may include a hard coat layer. The hard coat layer may be provided in the polarizing plate as an outermost layer and is preferably provided as an outermost layer on the side closer to the optical film when viewed from the polarizer. In the present specification, the hard coat layer refers to a layer for increasing the pencil hardness of the transparent support by forming the hard coat layer. Substantially, the pencil hardness (JIS K 5400) after the hard coat layer is laminated is preferably H or higher, more preferably 2H or higher, and most preferably 3H or higher. The thickness of the hard coat layer is preferably 0.4 μm to 35 μm, more preferably 1 μm to 30 μm, and most preferably 1.5 μm to 20 μm. Regarding the specific composition, the description of JP2012-103689A can be referred to.

Examples

The present invention will be described in more detail with reference to Examples below. Note that the materials, reagents, amounts and ratios of substances, operations and the like shown in Examples below can be appropriately modified without departing from the spirit of the present invention. The scope of the present invention is, therefore, not limited to the specific examples described below.

<Preparation of Support 1 (Cellulose Acetate Film T1)>

The following composition was put into a mixing tank and stirred while being heated to dissolve the respective components. Thus, a cellulose acetate solution was prepared.

| Composition of Cellulose Acetate Solution | |
|---|---|
| Cellulose acetate of acetylation degree of 60.7% to 61.1% | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 parts by mass |

16 parts by mass of the following additive (A), 92 parts by mass of methylene chloride, and 8 parts by mass of methanol were put into another mixing tank and stirred while being heated to prepare an additive (A) solution. 25 parts by mass of the additive (A) solution was mixed with 474 parts by mass of the cellulose acetate solution and stirred sufficiently to prepare a dope. The amount of the additive (A) added was 6.0 parts by mass with respect to 100 parts by mass of cellulose acetate.

Additive (A)

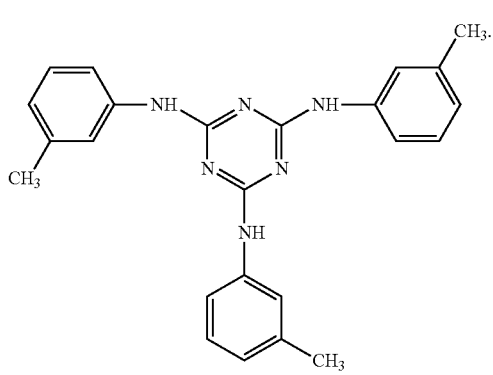

The obtained dope was cast using a band stretching machine. After a film surface temperature on the band reached 40° C., the film was dried with hot air at 70° C. for 1 minute and then dried with dry air at 140° C. for 10 minutes from the band. Thus, a cellulose acetate film T1 (support 1) having a residual solvent content of 0.3% by mass was prepared.

The width of the obtained long cellulose acetate film T1 was 1,490 mm and the thickness thereof was 80 μm. In addition, the in-plane retardation (Re) was 8 nm and the retardation in the thickness direction (Rth) was 78 nm.

<Preparation of Optically Anisotropic Layer 1 with Alignment Layer>

(Formation of Alignment Layer 1)

A coating solution for an alignment layer having the following composition was continuously applied to the support 1 prepared above using a #14 wire bar. The coated film was dried with hot air at 60° C. for 60 seconds and further dried with hot air at 100° C. for 120 seconds. The saponification degree of modified polyvinyl alcohol used was 96.8%.

| Composition of Coating Solution for Alignment Layer 1 | |
|---|---|
| Modified polyvinyl alcohol (A) | 10 parts by mass |
| Water | 308 parts by mass |
| Methanol | 70 parts by mass |
| Isopropanol | 29 parts by mass |
| Photopolymerization initiator (IRGACURE 2959, produced by BASF Japan Ltd.) | 0.8 parts by mass |

Modified polyvinyl alchol (A)

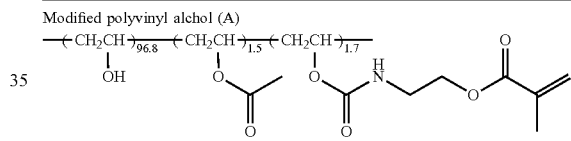

(Alignment Treatment)

A rubbing treatment was performed on the alignment layer disposed surface of the support on which the alignment layer had been formed so as to achieve alignment in a direction parallel to the transport direction. A rubbing roller was rotated at 450 rpm.

(Preparation of Optically Anisotropic Layer 1)

The following composition was dissolved in 270 parts by mass of methyl ethyl ketone to prepare a coating solution.

| (Composition for Forming Optically Anisotropic Layer 1) | |
|---|---|
| Discotic liquid crystal compound (A) | 80.0 parts by mass |
| Discotic liquid crystal compound (B) | 20.0 parts by mass |
| Fluoro alphatic group containing polymer (1) | 0.6 parts by mass |
| Photopolymerization initiator (IRGACURE 907, produced by BASF Japan Ltd.) | 3.0 parts by mass |
| Sensitizer (KAYACURE DETX, produced by Nippon Kayaku Co., Ltd.) | 1.0 part by mass |
| Compound A | 0.25 parts by mass |
| Compound AA | 1.0 part by mass |

Discotic liquid crystal compound (A)

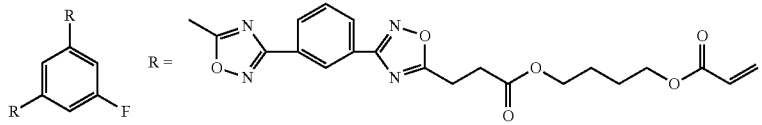

-continued (Composition for Forming Optically Anisotropic Layer 1)

Discotic liquid crystal compound (B)

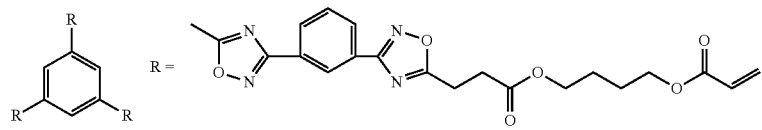

Fluoro aliphatic group containing polymer (1)

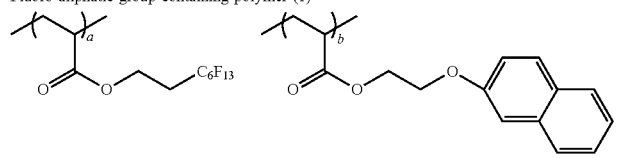

a/b = 38/62 (mass ratio)

Compound A

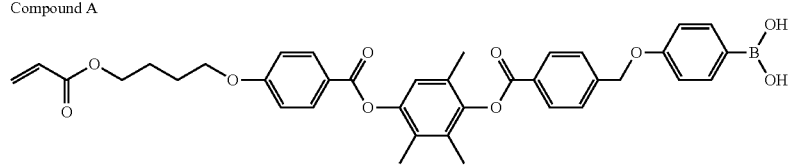

Compound AA

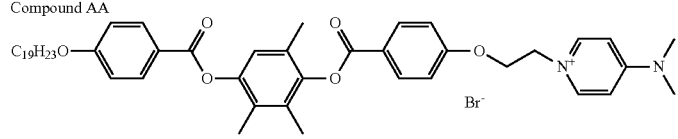

The prepared coating solution was applied to the rubbed surface of the alignment layer 1 using a #2.8 wire bar. The coating amount was 4.8 mL/m². Then, heating was performed in a thermostat bath at 120° C. for 300 seconds to align the discotic liquid crystal compound. Next, a cross-linking reaction was caused to proceed by irradiation with ultraviolet light at 80° C. for 1 minute by using a 160 W/cm high pressure mercury lamp to polymerize and fix the discotic liquid crystal compound and form an optically anisotropic layer. The thickness of the optically anisotropic layer was 0.8 μm, the liquid crystal director angle on the side closer to the support was 0°, and the liquid crystal director angle on the side closer to the air interface was 75°.

The film contrast was 10,000, there was no poor alignment, and the adhesiveness was satisfactory. The film contrast, poor alignment, and adhesiveness were measured and evaluated as follows. The liquid crystal compound of the optically anisotropic layer was subjected to reverse hybrid alignment.

<Preparation of Optically Anisotropic Layer 2 with Alignment Layer>

(Formation of Alignment Layer 2)

A coating solution for an alignment layer having the following composition was continuously applied to the support 1 using a #14 wire bar. The coated film was dried with hot air at 60° C. for 60 seconds and further dried with hot air at 100° C. for 120 seconds.

| Composition of Coating Solution for Alignment Layer | |
|---|---|
| Modified polyvinyl alcohol (B) | 10 parts by mass |
| Water | 371 parts by mass |
| Methanol | 119 parts by mass |
| Glutaraldehyde | 0.5 parts by mass |
| Photopolymerization initiator (IRGACURE 2959, produced by BASF Japan Ltd.) | 0.3 parts by mass |

Modified polyvinyl alcohol (B)

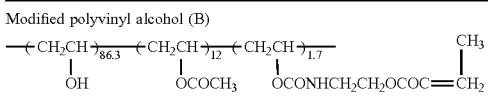

A rubbing treatment was continuously performed on the prepared alignment layer 2. At this time, the longitudinal direction of the long film was parallel to the transport direction and the rotational axis of a rubbing roller was set to be at 45° in a clockwise direction with respect to the longitudinal direction of the film.

(Formation of Optically Anisotropic Layer 2)

The coating amount of a coating solution including a liquid crystal compound having the following composition was adjusted such that the value when Re (0) was measured using a KOBRA 21 ADH became 125 nm and was continuously applied to the rubbed surface of the prepared alignment layer using a wire bar. The transport speed (V) of the film was set to 20 m/min. For the drying of the solvent of the coating solution and the alignment aging of the disk-like liquid crystal compound, the film was heated with hot air at 130° C. for 90 seconds. Subsequently, the film was irradiated with UV light at 80° C. and an optically anisotropic layer 2 with an alignment layer was formed.

90° C. and the discotic liquid crystal was aligned in a direction vertical with respect to the film surface as in Comparative Example 1.

<Preparation of Optically Anisotropic Layer 3 with Alignment Layer>

A coating solution shown in the following Table 1 was applied to the rubbed surface of the alignment layer 2 which

| Composition of Coating Solution for Optically Anisotropic Layer 2 | |
|---|---|
| Discotic liquid crystal compound (DLC1) | 1 part by mass |
| Discotic liquid crystal compound (A) | 91 parts by mass |
| Ethylene oxide modified trimethylol propane triacrylate (V#360, produced by Osaka Organic Chemical Industry, Ltd.) | 5 parts by mass |
| Photopolymerization initiator (IRGACURE 907, produced by BASF Japan Ltd.) | 3 parts by mass |
| Sensitizer (KAYACURE DETX, produced by Nippon Kayaku Co., Ltd.) | 1 part by mass |
| Pyridinium salt (A) | 0.5 parts by mass |
| Fluorine polymer (FP1) | 0.2 parts by mass |
| Fluorine polymer (FP2) | 0.1 parts by mass |
| Solvent (methyl ethyl ketone) (MEK) | 241 parts by mass |

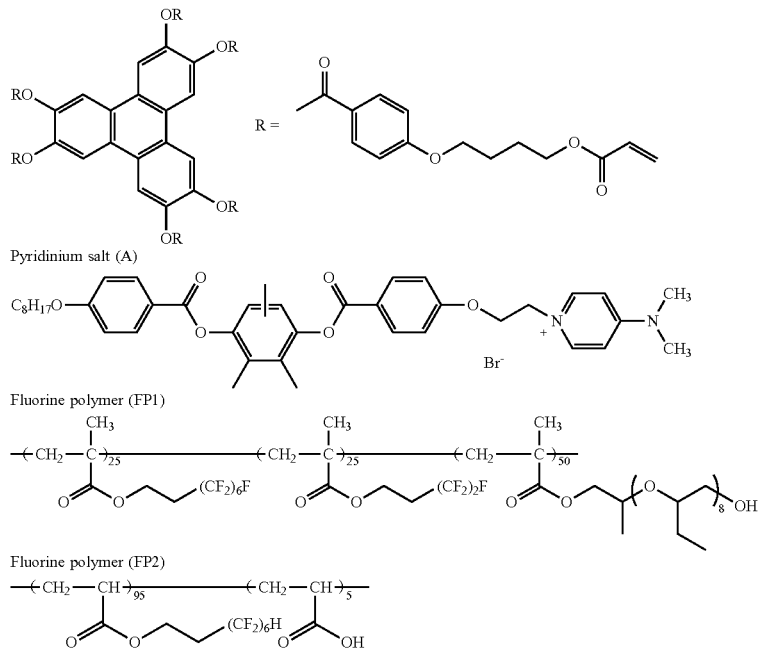

"25", "25", and "50" in the structure of the fluorine polymer (FP1), and "95" and "5" in the structure of the fluorine polymer (FP2) represent molar ratios of repeating units of the polymers.

The direction of the slow axis of the prepared optically anisotropic layer 2 was orthogonal to the rotational axis of a rubbing roller. That is, the direction of the slow axis was set to be at 45° in a clockwise direction with respect to the longitudinal direction of the support. It was confirmed that an average tilt angle with respect to the film surface of the disk-like surface of the discotic liquid crystal molecule was had been subjected to a rubbing treatment using a wire bar and the coated film was dried at room temperature for 30 seconds and then heated in an atmosphere of 90° C. for 2 minutes. Thereafter, the film was irradiated with UV light from a D bulb (lamp 90 mW/cm), produced by Heraeus Nobleight Fusion UV K.K., at an output power of 60% for 6 seconds to 12 seconds to prepare an optically anisotropic layer 3. It was confirmed that an average tilt angle with respect to the film surface of the rod-like liquid crystal compound was 0° and the rod-like liquid crystal was aligned in a direction horizontal with respect to the film surface.

TABLE 1

| Composition of Coating Solution for Optically Anisotropic Layer 3 | | |
|---|---|---|
| Material (type) | Material name (manufacturer) | Formulation |
| Liquid crystal compound | Polymerizable liquid crystal compound (LC-1-1) | 10.000 parts by mass |
| Polymerization initiator | Irg-819 (BASF Japan Ltd.) | 0.419 parts by mass |

TABLE 1-continued

Composition of Coating Solution for Optically Anisotropic Layer 3

| Material (type) | Material name (manufacturer) | Formulation |
|---|---|---|
| Alignment controlling agent | Horizontal alignment agent (LC-1-2) | 0.016 parts by mass |
| Solvent | 2-Butanone (Wako Pure Chemical Industries, Ltd.) | Appropriately adjusted according to thickness |

Polymerizable liquid crystal compound (LC-1-1)

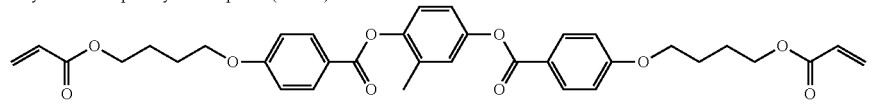

Horizontal alignment agent (LC-1-2)

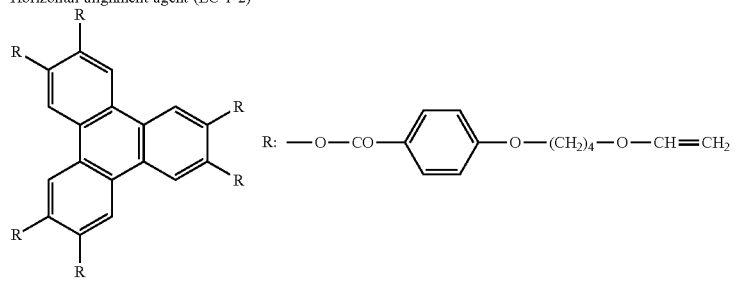

<Preparation of Optically Anisotropic Layer 4 with Alignment Layer>

A liquid, which was prepared by diluting a commercially available alignment layer (JALS-204R, produced by JSR Corporation) with methyl ethyl ketone in a ratio to methyl ethyl ketone in the composition of 1:1, was applied to the support 1 using a wire bar coater in an amount of 2.4 ml/m². Then, the coated film was dried with hot air at 120° C. for 120 seconds to form an alignment layer 4.

(Formation of Optically Anisotropic Layer 4)

A solution obtained by dissolving 1.8 g of a rod-like liquid crystal compound shown below, 0.06 g of a photopolymerization initiator (IRGACURE 907, produced by BASF Japan Ltd.), 0.02 g of a sensitizer (KAYACURE DETX, produced by Nippon Kayaku Co., Ltd.), and 0.002 g of an air interface side vertical alignment agent shown below in 9.2 g of cyclohexane/cyclopentanone (=65/35 (% by mass)) was applied to the rubbed surface of the alignment layer 4 using a #2 wire bar. This was attached to a metal frame and heated in a thermostat bath at 100° C. for 2 minutes to thereby align the rod-like liquid crystal compound. Next, using a 120 W/cm high-pressure mercury lamp, this was irradiated with UV light at 100° C. for 30 seconds to thereby crosslink the rod-like liquid crystal compound. Subsequently, the resultant was cooled to room temperature to form an optically anisotropic layer 4.

Polymerizable Liquid Crystal Compound (LC-2)

Air interface side vertical alignment agent: exemplary compound described in JP2003-119959 (II-4)

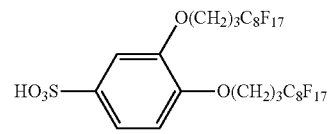

<Preparation of Optically Anisotropic Layer 5 with Alignment Layer>

An optically anisotropic layer 5 was prepared by using an optically anisotropic layer 5-1 and an optically anisotropic layer 5-2 shown below.

A rubbing treatment was continuously performed on the alignment layer 1 formed on the support 1. At this time, the longitudinal direction of the long film was parallel to the transport direction and an angle between the longitudinal direction of the film and the rotational axis of a rubbing roller was set to be 75° (in a clockwise direction) (when the longitudinal direction of the film was set to 90°, the rotational axis of the rubbing roller was at 15°).

(Formation of Optically Anisotropic Layer 5-1)

A coating solution for an optically anisotropic layer 5-1 including discotic liquid crystal compounds having the following composition was continuously applied to the rubbed surface of the prepared alignment layer using a #2.2 wire bar. For the drying of the solvent of the coating solution

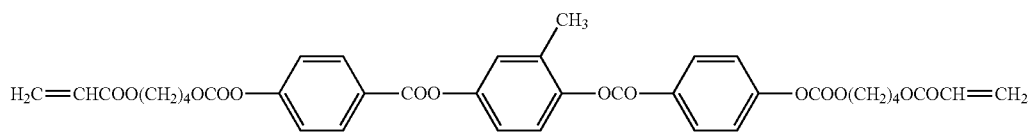

and the alignment aging of the discotic liquid crystal compound, the film was heated with hot air at 115° C. for 90 seconds. Subsequently, the film was heated with hot air at 80° C. for 60 seconds and irradiated with UV light at 80° C. to fix the alignment of the liquid crystal compound. The thickness of the obtained optically anisotropic layer was 0.8 μm. It was confirmed that an average tilt angle with respect to the film surface of the disk-like surface of the discotic liquid crystal compound was 90° C. and the discotic liquid crystal compound was aligned in a direction vertical with respect to the film surface. In addition, the angle of the slow axis was parallel with the rotational axis of the rubbing roller and when the longitudinal direction of the film was set to 90° (the width direction of the film was set to 0°), the rotational axis of the rubbing roller was at 15°.

roller was set to be −75° (in a counterclockwise direction) (when the longitudinal direction of the film was set to 90°, the rotational axis of a rubbing roller was at 165°).

A coating solution having the following composition was continuously applied to the prepared alignment layer using a #5 wire bar. For the drying of the solvent of the coating solution and the alignment aging of the rod-like liquid crystal compound, the film was heated with hot air at 60° C. for 60 seconds and irradiated with UV light at 60° C. to fix the alignment of the liquid crystal compound. The thickness of the optically anisotropic layer 5-2 was 2.0 μm. It was confirmed that an average tilt angle with respect to the film surface of the long axis of the rod-like liquid crystal compound was 0° and the rod-like liquid crystal compound was

| Composition of Coating Solution for Optically Anisotropic Layer 5-1 | |
|---|---|
| Discotic liquid crystal compound (A) | 80 parts by mass |
| Discotic liquid crystal compound (B) | 20 parts by mass |
| Ethylene oxide modified trimethylol propane triacrylate (V#360, produced by Osaka Organic Chemical Industry, Ltd.) | 10 parts by mass |
| Photopolymerization initiator (IRGACURE 907, produced by BASF Japan Ltd.) | 3 parts by mass |
| Pyridinium salt (B) | 0.9 parts by mass |
| Boronic acid containing compound below | 0.08 parts by mass |
| Polymer (A) | 1.2 parts by mass |
| Fluorine polymer (FP1-2) | 0.3 parts by mass |
| Methyl ethyl ketone | 183 parts by mass |
| Cyclohexanone | 40 parts by mass |

Pyridinium salt (B)

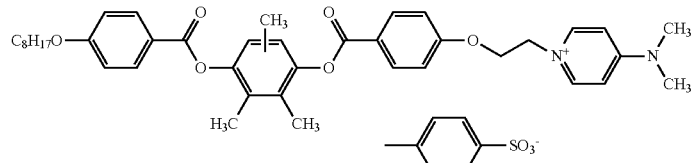

Boronic acid containing compound

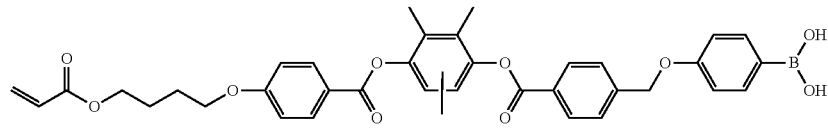

Polymer (A)

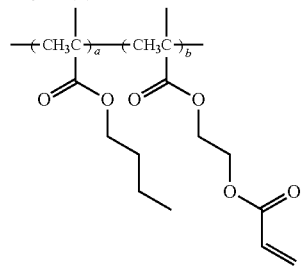

Fluorine polymer (FP1-2)

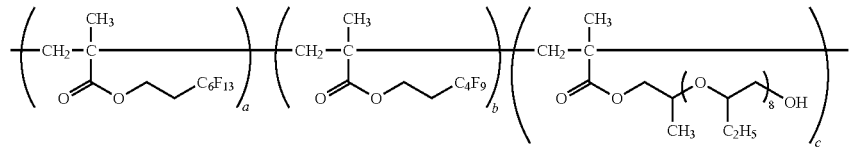

a/b/c = 20/20/60 wt % Mw = 16000

(Formation of Optically Anisotropic Layer 5-2)

A rubbing treatment was continuously performed on the prepared optically anisotropic layer 5-2. At this time, the longitudinal direction of the long film was parallel to the transport direction and the angle between the longitudinal direction of the film and the rotational axis of a rubbing aligned in a direction horizontal with respect to the film surface of the liquid crystal compound. In addition, the angle of the slow axis was orthogonal to the rotational axis of a rubbing roller and when the longitudinal direction of the film was set to 90° (the width direction of the film was set to 0°), the rotational axis of the rubbing roller was at 75°.

| Composition of Coating Solution for Optically Anisotropic Layer 5-2 | |
| --- | --- |
| Polymerizable liquid crystal compound (LC-1-1) | 80 parts by mass |
| Polymerizable liquid crystal compound (LC-2) | 20 parts by mass |
| Photopolymerization initiator (IRGACURE 907, produced by BASF Japan Ltd.) | 3 parts by mass |
| Sensitizer (KAYACURE DETX, produced by Nippon Kayaku Co., Ltd.) | 1 part by mass |
| Fluorine polymer (FP4) | 0.3 parts by mass |
| Methyl ethyl ketone | 193 parts by mass |
| Cyclohexanone | 50 parts by mass |

Fluorine polymer (FP4)

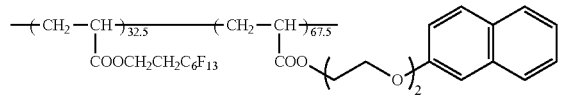

<Preparation of Optically Anisotropic Layer 6 with Alignment Layer>

(Formation of Rubbing Alignment Layer)

A rubbing treatment was continuously performed on the alignment layer 1 formed on the support 1. At this time, the longitudinal direction of the long film was parallel to the transport direction and the angle between the longitudinal direction of the film and the rotational axis of a rubbing roller was set to 15° (in a clockwise direction) (when the longitudinal direction of the film was set to 90°, the rotational axis of the rubbing roller was at 75°).

An optically anisotropic layer 6 was prepared in the same manner as in the preparation of the optically anisotropic layer 5 with an alignment layer except that the coating solution for an optically anisotropic layer 5-1 was changed to the following coating solution for an optically anisotropic layer 6-1.

| Composition of Coating Solution for Optically Anisotropic Layer 6-1 | |
| --- | --- |
| Polymerizable liquid crystal compound (LC-1-1) | 80 parts by mass |
| Polymerizable liquid crystal compound (LC-2) | 20 parts by mass |
| Photopolymerization initiator (IRGACURE 907, produced by BASF Japan Ltd.) | 3 parts by mass |
| Polymer (A) | 0.6 parts by mass |
| Fluorine polymer (FP1) | 0.3 parts by mass |
| Methyl ethyl ketone | 183 parts by mass |
| Cyclohexanone | 40 parts by mass |

<Formation of Acrylic Polymer Layer and Preparation of Optical Film Material>

A coating solution prepared according to the formulation of a coating solution (B) shown in Table 2 below was applied to the surface of each of the prepared optically anisotropic layers 1 to 6 with alignment layers using a wire bar. The coated layer was dried at 60° C. for 150 seconds and then further cured by irradiation with ultraviolet rays under an atmosphere purged with nitrogen in an oxygen concentration of about 0.1% by using a 160 W/cm air-cooled metallic halide lamp (made by Eyegraphics Co., Ltd.) with an illuminance of 400 mW/cm$^2$ and an amount of irradiation of 300 mJ/cm$^2$. Thus, an acrylic polymer layer having a thickness of 5 μm was formed and optical film materials 1 to 6 were obtained.

TABLE 2

| Composition of Coating Solution (B) | | |
| --- | --- | --- |
| Material (type) | Material name (manufacturer) | Formulation |
| Acrylate | PET-30 (Nippon Kayaku Co., Ltd.) | 10.000 parts by mass |
| Photopolymerization initiator | IRGACURE 127 (BASF Japan Ltd.) | 0.32 parts by mass |
| Leveling agent | SP-13 | 0.2 parts by mass |
| Solvent | 2-Buthanone (Wako Pure Chemical Industries, Ltd.) | Appropriately adjusted according to thickness |

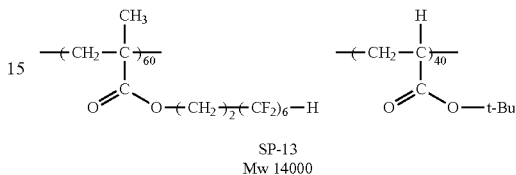

SP-13
Mw 14000

<Preparation of Optical Film Materials 7 to 12>

Optical film materials 7 to 12 were obtained in the same procedure as in the procedures of the respective optical film materials 1 to 6 except that the support 1 was changed to PET (having a thickness of 75 μm) produced by Fujifilm Corporation.

<Preparation of Polarizing Plates 1 to 12>

(Preparation of Polarizer)

A rolled polyvinyl alcohol film having a thickness of 80 μm was continuously stretched by 5 times in an aqueous iodine solution and dried to obtain a polarizing film (polarizer) having a thickness of 20 μm.

(Preparation of Acrylic Resin Sheet T2)

The following acrylic resin was used. For this acrylic resin, a commercially available product can be used.

DIANAL BR88 (product name), produced by Mitsubishi Rayon Co., Ltd., weight average molecular weight: 1,500,000 (hereinafter, referred to as an "acrylic resin AC-1")

(Ultraviolet Absorber)

The following ultraviolet absorber was used.

UV absorber 1: TINUVIN 328 (produced by BASF Japan Ltd.)

(Preparation of Dope B)

The following composition was put into a mixing tank and was stirred while being heated to dissolve the respective components, thereby preparing a dope B.

| (Composition of Dope B) | |
| --- | --- |
| Acrylic resin AC-1 | 100 parts by mass |
| Ultraviolet absorber UV absorber | 12 parts by mass |
| Dichloromethane | 300 parts by mass |
| Ethanol | 40 parts by mass |

Using a band casting machine, the prepared dope was uniformly cast from a casting die onto a stainless steel endless band (casting support) at a width of 2,000 mm. When the amount of the residual solvent in the dope was 40% by mass, a polymer film was peeled off from the casting support, was carried while being not stretched, and was dried in a drying zone at 130° C. The thickness of the obtained acrylic resin sheet T2 was 40 μm.

One surface of the thus-obtained resin sheet T2 was subjected to a corona treatment and the corona-treated surface was laminated to one side of the polarizing film using a 3% aqueous solution of PVA (PVA-117H, produced by Kuraray Co. Ltd.) as an adhesive.

(Cellulose Acylate Film)

A commercially available cellulose acylate film (FUJITAC ZRD40, produced by Fujifilm Corporation) was immersed in a 1.5 mol/L aqueous NaOH solution (saponification solution) maintained at 55° C. for 2 minutes and then the film was washed with water, and then immersed in a 0.05 mol/L aqueous sulfuric acid solution at 25° C. for 30 seconds. Further, the film was passed through a washing bath under running water for 30 seconds to make the film neutral. Then, water removal was repeated three times with an air knife, water was dropped on the films, and then the films were allowed to stay in a drying zone at 70° C. for 15 seconds to dry the films, thereby preparing a saponified film The saponified cellulose acylate film ZRD40 obtained in the above-described method was laminated to the other side of the polarizing film to which the acrylic resin sheet was laminated using a 3% aqueous solution of PVA (PVA-117H, produced by Kuraray Co. Ltd.) as an adhesive such that the longitudinal direction of the roll of the prepared polarizer and the longitudinal direction of the roll of the cellulose acylate film ZRD40 were parallel to each other.

The surface of ZRD40 of the polarizing plate obtained above was subjected to a corona treatment and then ZRD40 was laminated to the surface of the acrylic polymer layer of each of the optical film materials 1 to 12 using a commercially available acrylic adhesive (UV-3300, produced by Toagosei Co., Ltd.). After the lamination, the support 1 was peeled off (easily peeled off) at the interface with the alignment layer to obtain polarizing plates 1 to 12.

<Polarizing Plates 13 to 24>

Polarizing plates 13 to 24 were prepared in the same manner as in the preparation of the polarizing plates 1 to 12 except that instead of laminating ZRD40 to one surface of each of the polarizers in the polarizing plates 1 to 12, the corona-treated surface of the acrylic resin sheet T2 which had been subjected to a corona treatment was laminated to each polarizer.

(Preparation of Cyclic Olefin Resin Sheet T3)

A commercially available cycloolefin polymer film "ZEONOR ZF14" (produced by Zeon Corporation) was stretched at a stretching temperature (Tg represents a glass transition temperature of cyclic olefin resin) and a stretching ratio shown in Table 3 below to obtain a cyclic olefin resin sheet T3.

TABLE 3

| Stretching conditions [° C.] | TD stretching ratio [%] | MD stretching ratio [%] | Physical properties of film | | |
|---|---|---|---|---|---|
| | | | Thickness [μm] | Re [nm] | Rth [nm] |
| Tg + 15 | 40 | 40 | 45 | 3 | 132 |

<Polarizing Plates 25 to 36>

Polarizing plates 25 to 36 were obtained in the same manner as in the preparation of the polarizing plates 1 to 12 except that instead of laminating ZRD40 to one surface of each of the polarizers in the polarizing plates 1 to 12, the cyclic olefin resin sheet T3 obtained above was laminated to each polarizer.

<Polarizing Plates 37 to 48>

Polarizing plates 37 to 48 were obtained in the same manner as in the preparation of the polarizing plates 1 to 12 except that ZRD40 was not provided in the polarizing plates 1 to 12. That is, in the polarizing plates 37 to 48, the acrylic polymer layer of the optical film material was directly bonded to the polarizer through an adhesive.

Comparative Examples

Preparation of Polarizing Plates 49 to 72

Polarizing plates 49 to 72 (each corresponding to Comparative Examples 1 to 24) were prepared in the same manner as in the preparation of the polarizing plates 1 to 6, 13 to 18, 25 to 30, and 37 to 42 except that the surface of the support 1 on which an alignment layer was provided in the polarizing plates 1 to 6, 13 to 18, 25 to 30, and 37 to 42 was subjected to an alkali saponification treatment under the following conditions. However, in each of the polarizing plates, the support 1 and the alignment layer were closely attached to each other and thus T1 was not peeled off.

(Alkali Saponification Treatment)

The above-mentioned cellulose acylate film (T1) was passed through a dielectric-type heated roller at a temperature of 60° C. to increase the film surface temperature to 40° C., and then an alkaline solution with the following composition was applied to the band surface of the film in a coating amount of 14 ml/m² using a bar coater and the film was carried for 10 seconds under a steam type far-infrared heater heated up to 110° C., produced by Noritake Co., Ltd. Subsequently, pure water was applied thereto in an amount of 3 ml/m² using the bar coater similarly. Next, washing by using a fountain coater and drainage by using an air knife were repeated 3 times and then the resultant was carried and dried for 10 seconds in a drying zone kept at 70° C. to prepare a cellulose acylate film which had been subjected to the alkali saponification treatment.

<Preparation of Polarizing Plates 73 to 78>

Polarizing plates 73 to 78 (each corresponding to Comparative Examples 25 to 30) were prepared in the same manner as in the preparation of the polarizing plates 67 to 72 except that the alkali saponification treatment was performed not on the surface of the support 1 on which the alignment layer was provided in the polarizing plates 67 to 72 but on the opposite surface thereto and the surface was laminated to the polarizer using a vinyl alcohol adhesive.

Mounting Evaluation on Liquid Crystal Display Device
(Mounting on IPS Type Liquid Crystal Display Device)

A polarizing plate on the side closer to the display surface was peeled off from a commercially available liquid crystal television set (slim type 42 type liquid crystal TV set of IPS mode, distance between the polarizing plate surface on the side closer to backlight and the backlight: 1.5 mm), and the polarizing plates prepared above were re-laminated to the liquid crystal cell with an adhesive such that the side closer to the optically anisotropic layer (optical film) described in Table 4 below was disposed on the side closer to the liquid crystal cell with respect to the polarizing film. The re-assembled liquid crystal television set was kept under an environment of 40° C. at a relative humidity of 80% for 20 days, the environment was changed to an environment of 25° C. at a relative humidity of 60%, and the backlight was continuously light up in a black display state. Then, a tint change was evaluated through visual observation after 48 hours had elapsed.

(Tint Change in Inclined Direction)

When a tint change was observed from a direction inclined to the device, the tint change was evaluated based on the following criteria. The results are shown in Table 4.
A: A circular tint change was not visually recognized.
B: A circular tint change was hardly visually recognized.
C: A circular tint change was small but clearly visually recognized.
D: A circular tint change was visually recognized.

TABLE 4-1

|  | Optically anisotropic layer | | Protective film for polarizing plate (side where optically anisotropic layer is attached) | Thickness of polarizing plate | Mounting evaluation |
|---|---|---|---|---|---|
| Example 1 | Polarizing plate 1 | 1 | ZRD40 | 112.3 | B |
| Example 2 | Polarizing plate 2 | 2 | ZRD40 | 112.5 | B |
| Example 3 | Polarizing plate 3 | 3 | ZRD40 | 112.7 | B |
| Example 4 | Polarizing plate 4 | 4 | ZRD40 | 112.8 | B |
| Example 5 | Polarizing plate 5 | 5 | ZRD40 | 114.5 | B |
| Example 6 | Polarizing plate 6 | 6 | ZRD40 | 114.5 | B |
| Example 7 | Polarizing plate 7 | 1 | ZRD40 | 112.3 | B |
| Example 8 | Polarizing plate 8 | 2 | ZRD40 | 112.5 | B |
| Example 9 | Polarizing plate 9 | 3 | ZRD40 | 112.7 | B |
| Example 10 | Polarizing plate 10 | 4 | ZRD40 | 112.8 | B |
| Example 11 | Polarizing plate 11 | 5 | ZRD40 | 114.5 | B |
| Example 12 | Polarizing plate 12 | 6 | ZRD40 | 114.5 | B |
| Example 13 | Polarizing plate 13 | 1 | T2 | 115.3 | A |
| Example 14 | Polarizing plate 14 | 2 | T2 | 115.5 | A |
| Example 15 | Polarizing plate 15 | 3 | T2 | 115.7 | A |
| Example 16 | Polarizing plate 16 | 4 | T2 | 115.8 | A |
| Example 17 | Polarizing plate 17 | 5 | T2 | 117.5 | A |
| Example 18 | Polarizing plate 18 | 6 | T2 | 117.5 | A |
| Example 19 | Polarizing plate 19 | 1 | T2 | 115.3 | A |
| Example 20 | Polarizing plate 20 | 2 | T2 | 115.5 | A |
| Example 21 | Polarizing plate 21 | 3 | T2 | 115.7 | A |
| Example 22 | Polarizing plate 22 | 4 | T2 | 115.8 | A |
| Example 23 | Polarizing plate 23 | 5 | T2 | 117.5 | A |
| Example 24 | Polarizing plate 24 | 6 | T2 | 117.5 | A |
| Example 25 | Polarizing plate 25 | 1 | T3 | 120.3 | A |

TABLE 4-2

| Example 26 | Polarizing plate 26 | 2 | T3 | 120.5 | A |
|---|---|---|---|---|---|
| Example 27 | Polarizing plate 27 | 3 | T3 | 120.7 | A |
| Example 28 | Polarizing plate 28 | 4 | T3 | 120.8 | A |
| Example 29 | Polarizing plate 29 | 5 | T3 | 122.5 | A |
| Example 30 | Polarizing plate 30 | 6 | T3 | 122.5 | A |
| Example 31 | Polarizing plate 31 | 1 | T3 | 120.3 | A |
| Example 32 | Polarizing plate 32 | 2 | T3 | 120.5 | A |
| Example 33 | Polarizing plate 33 | 3 | T3 | 120.7 | A |
| Example 34 | Polarizing plate 34 | 4 | T3 | 120.8 | A |
| Example 35 | Polarizing plate 35 | 5 | T3 | 122.5 | A |
| Example 36 | Polarizing plate 36 | 6 | T3 | 122.5 | A |
| Example 37 | Polarizing plate 37 | 1 | None | 72.3 | A |
| Example 38 | Polarizing plate 38 | 2 | None | 72.5 | A |
| Example 39 | Polarizing plate 39 | 3 | None | 72.7 | A |
| Example 40 | Polarizing plate 40 | 4 | None | 72.8 | A |
| Example 41 | Polarizing plate 41 | 5 | None | 74.5 | A |
| Example 42 | Polarizing plate 42 | 6 | None | 74.5 | A |
| Example 43 | Polarizing plate 43 | 1 | None | 72.3 | A |
| Example 44 | Polarizing plate 44 | 2 | None | 72.5 | A |
| Example 45 | Polarizing plate 45 | 3 | None | 72.7 | A |
| Example 46 | Polarizing plate 46 | 4 | None | 72.8 | A |
| Example 47 | Polarizing plate 47 | 5 | None | 74.5 | A |
| Example 48 | Polarizing plate 48 | 6 | None | 74.5 | A |
| Comparative Example 1 | Polarizing plate 49 | 1 | ZRD40 | 192.3 | D |
| Comparative Example 2 | Polarizing plate 50 | 2 | ZRD40 | 192.5 | D |
| Comparative Example 3 | Polarizing plate 51 | 3 | ZRD40 | 192.7 | D |
| Comparative Example 4 | Polarizing plate 52 | 4 | ZRD40 | 192.8 | D |

TABLE 4-3

| Comparative Example 5 | Polarizing plate 53 | 5 | ZRD40 | 194.5 | D |
|---|---|---|---|---|---|
| Comparative Example 6 | Polarizing plate 54 | 6 | ZRD40 | 194.5 | D |
| Comparative Example 7 | Polarizing plate 55 | 1 | T2 | 195.3 | C |
| Comparative Example 8 | Polarizing plate 56 | 2 | T2 | 195.5 | C |
| Comparative Example 9 | Polarizing plate 57 | 3 | T2 | 195.7 | C |
| Comparative Example 10 | Polarizing plate 58 | 4 | T2 | 195.8 | C |
| Comparative Example 11 | Polarizing plate 59 | 5 | T2 | 197.5 | C |
| Comparative Example 12 | Polarizing plate 60 | 6 | T2 | 197.5 | C |
| Comparative Example 13 | Polarizing plate 61 | 1 | T3 | 200.3 | C |
| Comparative Example 14 | Polarizing plate 62 | 2 | T3 | 200.5 | C |
| Comparative Example 15 | Polarizing plate 63 | 3 | T3 | 200.7 | C |
| Comparative Example 16 | Polarizing plate 64 | 4 | T3 | 200.8 | C |
| Comparative Example 17 | Polarizing plate 65 | 5 | T3 | 202.5 | C |
| Comparative Example 18 | Polarizing plate 66 | 6 | T3 | 202.5 | C |
| Comparative Example 19 | Polarizing plate 67 | 1 | None | 152.3 | C |
| Comparative Example 20 | Polarizing plate 68 | 2 | None | 152.5 | C |
| Comparative Example 21 | Polarizing plate 69 | 3 | None | 152.7 | C |
| Comparative Example 22 | Polarizing plate 70 | 4 | None | 152.8 | C |
| Comparative Example 23 | Polarizing plate 71 | 5 | None | 154.5 | C |
| Comparative Example 24 | Polarizing plate 72 | 6 | None | 154.5 | C |
| Comparative Example 25 | Polarizing plate 73 | 1 | None | 149.3 | C |
| Comparative Example 26 | Polarizing plate 74 | 2 | None | 149.5 | C |
| Comparative Example 27 | Polarizing plate 75 | 3 | None | 149.7 | C |
| Comparative Example 28 | Polarizing plate 76 | 4 | None | 149.8 | C |

TABLE 4-3-continued

| | | | | | |
|---|---|---|---|---|---|
| Comparative Example 29 | Polarizing plate 77 | 5 | None | 151.5 | C |
| Comparative Example 30 | Polarizing plate 78 | 6 | None | 151.5 | C |

Explanation of References

1: polarizer
2: optically anisotropic layer
3: acrylic polymer layer
4: protective film 1
5: hard coat layer
6: protective film 2
12: alignment layer

What is claimed is:

1. A polarizing plate comprising:
a polarizer; and
an optical film including an alignment layer, an optically anisotropic layer, and an optically isotropic acrylic polymer layer on at least one surface of the polarizer,
wherein the optically anisotropic layer is a layer formed by irradiating a polymerizable composition including a liquid crystal compound that is directly applied to the alignment layer with light to polymerize the liquid crystal compound,
the acrylic polymer layer is a layer formed by curing a polymerizable composition including (meth)acrylate that is directly applied to a surface of the layer formed from the polymerizable composition including a liquid crystal compound, and
the thickness of the acrylic polymer layer is larger than the thickness of the optically anisotropic layer.

2. The polarizing plate according to claim 1,
wherein the thickness of the optically anisotropic layer is 0.5 μm to 5 μm.

3. The polarizing plate according to claim 1,
wherein the thickness of the optically anisotropic layer is 0.5 μm to 3 μm.

4. The polarizing plate according to claim 1,
wherein the alignment layer, the optically anisotropic layer, the acrylic polymer layer, and the polarizer are disposed in this order.

5. The polarizing plate according to claim 3,
wherein the alignment layer, the optically anisotropic layer, the acrylic polymer layer, and the polarizer are disposed in this order.

6. The polarizing plate according to claim 4,
wherein only an adhesive layer or only an adhesive layer and a protective film provided on the surface of the polarizer are provided between the acrylic polymer layer and the polarizer.

7. The polarizing plate according to claim 5,
wherein only an adhesive layer or only an adhesive layer and a protective film provided on the surface of the polarizer are provided between the acrylic polymer layer and the polarizer.

8. The polarizing plate according to claim 1,
wherein the acrylic polymer layer, the optically anisotropic layer, the alignment layer, and the polarizer are disposed in this order.

9. The polarizing plate according to claim 8,
wherein only an adhesive layer or only an adhesive layer and a protective film provided on the surface of the polarizer are provided between the alignment layer and the polarizer.

10. The polarizing plate according to claim 1,
wherein the optical film is provided on any one of surfaces of the polarizer and a cellulose acylate polymer film, an acrylic polymer film, or a cycloolefin polymer film is provided on the other surface.

11. The polarizing plate according to claim 1,
wherein the liquid crystal compound is a compound having two or more (meth)acrylic groups.

12. The polarizing plate according to claim 5,
wherein the liquid crystal compound is a compound having two or more (meth)acrylic groups.

13. The polarizing plate according to claim 6,
wherein the liquid crystal compound is a compound having two or more (meth)acrylic groups.

14. The polarizing plate according to claim 8,
wherein the liquid crystal compound is a compound having two or more (meth)acrylic groups.

15. The polarizing plate according to claim 1,
wherein a hard coat layer is provided as an outermost layer on the side closer to the optical film with respect to the polarizer.

16. A method for producing the polarizing plate according to claim 1 comprising:
(1) preparing the following optical film material including
a temporary support,
an alignment layer,
an optically anisotropic layer, and
an optically isotropic acrylic polymer layer,
in which the optically anisotropic layer is a layer formed by irradiating a polymerizable composition including a liquid crystal compound that is directly applied to the alignment layer with light to polymerize the liquid crystal compound,
the acrylic polymer layer is a layer formed by curing a polymerizable composition including (meth)acrylate that is directly applied to a surface of the layer formed from the polymerizable composition including a liquid crystal compound, and
the thickness of the acrylic polymer layer is larger than the thickness of the optically anisotropic layer;
(2) peeling off the temporary support of the optical film material; and
(3) laminating the optical film material or an optical film after peeling off the temporary support on a film including a polarizer.

17. The method according to claim 16,
wherein the optical film material is laminated on the film including a polarizer on the surface on the side closer to the acrylic polymer layer when viewed from the optically anisotropic layer and then the temporary support of the optical film material is peeled off.

18. The method according to claim 16,
wherein the temporary support of the optical film material is peeled off and then the optical film after the peeling-off of the temporary support is laminated on the film including a polarizer.

19. The method according to claim 16,
wherein the lamination is performed through an adhesive layer.

20. An optical film material that is produced using the method according to claim 16, the material including:
a temporary support;
an alignment layer;
an optically anisotropic layer; and
an optically isotropic acrylic polymer layer, wherein the optically anisotropic layer is a layer formed by irradiating a polymerizable composition including a liquid crystal compound that is directly applied to the alignment layer with light to polymerize the liquid crystal compound,
the acrylic polymer layer is a layer formed by curing a polymerizable composition including (meth)acrylate that is directly applied to a surface of the layer formed from the polymerizable composition including a liquid crystal compound, and
the thickness of the acrylic polymer layer is larger than the thickness of the optically anisotropic layer.

* * * * *